United States Patent
Ibsen et al.

(10) Patent No.: US 7,085,492 B2
(45) Date of Patent: Aug. 1, 2006

(54) WAVELENGTH DIVISION MULTIPLEXED DEVICE

(75) Inventors: Per Eld Ibsen, København N (DK); Claus Friis Pedersen, Brønshøj (DK)

(73) Assignee: Ibsen Photonics A/S, Farum (DK)

( * ) Notice: Subject to any disclaimer, the term of this patent is extended or adjusted under 35 U.S.C. 154(b) by 700 days.

(21) Appl. No.: 09/940,554

(22) Filed: Aug. 27, 2001

(65) Prior Publication Data

US 2003/0067645 A1    Apr. 10, 2003

(51) Int. Cl.
    *H04B 17/00*  (2006.01)
(52) U.S. Cl. .......................... 398/38; 398/33
(58) Field of Classification Search ................ 398/34, 398/38, 43; 385/14, 24, 140
    See application file for complete search history.

(56) References Cited

U.S. PATENT DOCUMENTS

| | | |
|---|---|---|
| 4,102,576 A | 7/1978 | Maeda et al. |
| 5,278,687 A * | 1/1994 | Jannson et al. ............... 398/79 |
| 5,355,237 A | 10/1994 | Lang et al. |
| 5,559,597 A | 9/1996 | Battey et al. |
| 5,805,759 A * | 9/1998 | Fukushima ............... 385/140 |
| 5,917,625 A * | 6/1999 | Ogusu et al. ............... 385/24 |
| 5,966,483 A | 10/1999 | Chowdhury |
| 5,998,796 A | 12/1999 | Liu et al. |
| 6,108,471 A | 8/2000 | Zhang et al. |
| 6,137,933 A | 10/2000 | Hunter et al. |

(Continued)

FOREIGN PATENT DOCUMENTS

| | | |
|---|---|---|
| EP | 1001287 A2 | 5/2000 |
| EP | 1052868 A2 | 11/2000 |
| GB | 2374142 A | 10/2002 |
| WO | WO 01/09656 A1 | 2/2001 |
| WO | WO 01/42825 A1 | 6/2001 |
| WO | WO 02/057814 A2 | 7/2002 |
| WO | WO 02/067475 A2 | 8/2002 |

OTHER PUBLICATIONS

Churin et al., "*Passband flattening and broadening techniques for high spectral efficiency wavelength demultiplexers*", *Electronic Letters*, Jan. 7, 1999, vol. 35, No. 1.

(Continued)

*Primary Examiner*—David C. Payne
(74) *Attorney, Agent, or Firm*—Altera Law Group, LLC

(57) ABSTRACT

A wavelength division multiplexed device is based on a transmission grating spectrometer having at least two diffractive optical elements. The WDM device provides flexible use and may be widely applied in WDM systems. The device is useful for multiplexing and demultiplexing, channel monitoring, for adding and dropping channels, and for controlling the power in individual channels within a multiple channel signal. The device provides for dynamic control of individual channels, and may be advantageous in use as a gain flattening filter.

28 Claims, 29 Drawing Sheets

U.S. PATENT DOCUMENTS

| | | |
|---|---|---|
| 6,144,468 A | 11/2000 | Watanabe |
| 6,144,487 A | 11/2000 | Michishita |
| 6,144,783 A | 11/2000 | Epworth et al. |
| 6,269,203 B1 | 7/2001 | Davies et al. |
| 6,275,630 B1 | 8/2001 | Yang et al. |
| 6,449,066 B1 | 9/2002 | Arns et al. |
| 6,459,831 B1 | 10/2002 | Cao et al. |
| 2002/0050557 A1 | 5/2002 | Kuroda et al. |
| 2002/0054289 A1 | 5/2002 | Thibault et al. |
| 2002/0154855 A1 | 10/2002 | Rose et al. |
| 2003/0030793 A1 | 2/2003 | Bastue et al. |

OTHER PUBLICATIONS

U.S. Appl. No. 09/789,888—"Grating Structures and Methods of Making the Grating Structure".

International Search Report for PCT/EP02/09295.

Churin et al., "*Passband flattening and broadening techniques for high spectral efficiency wavelength demultiplexers*", Electronics Letters, IEE Stevenage, GB, vol. 35, No. 1, Jan. 7, 1999, pp. 27-28, XP006011645, ISSN: 0013-5194, figs. 1, 2.

* cited by examiner

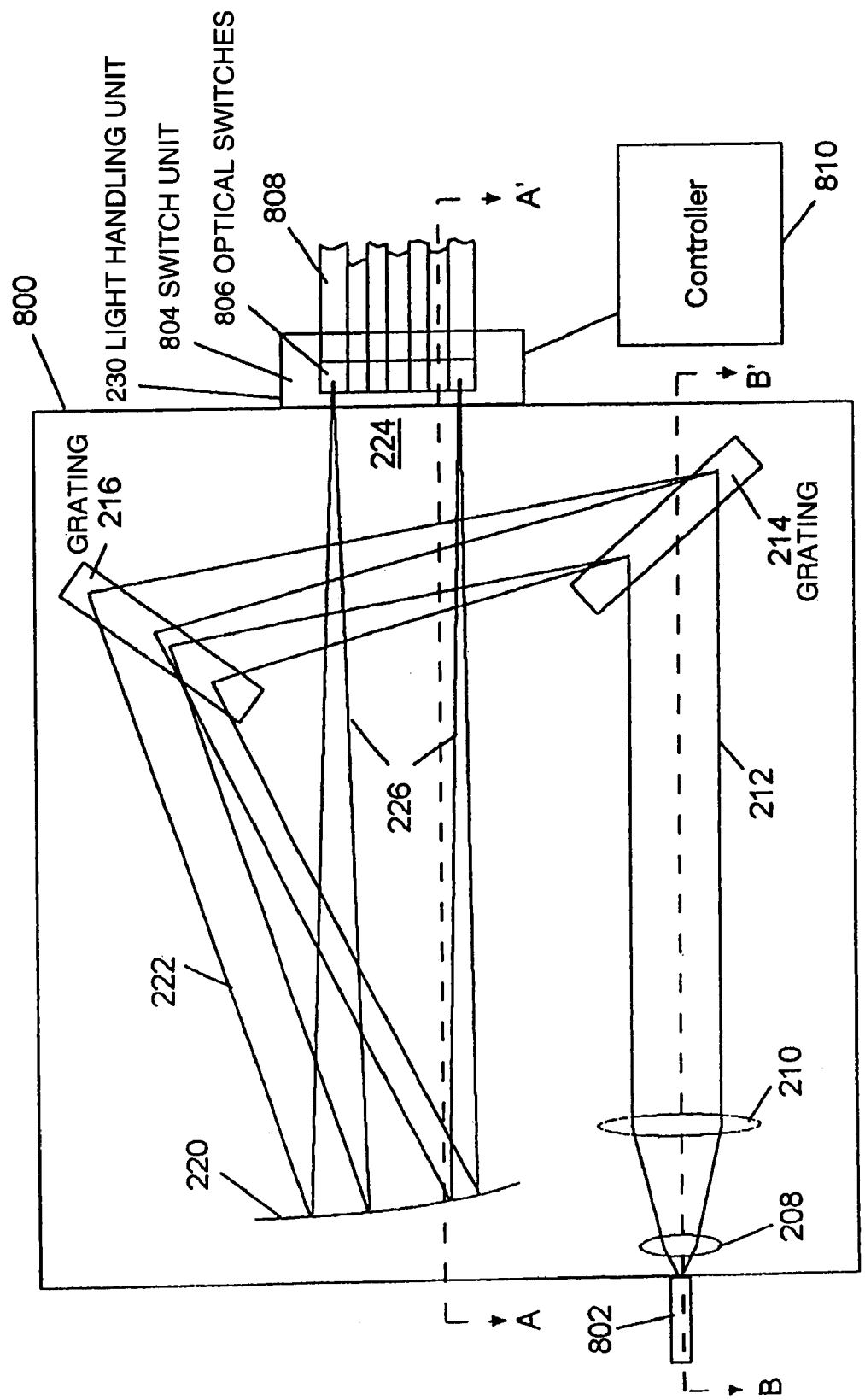

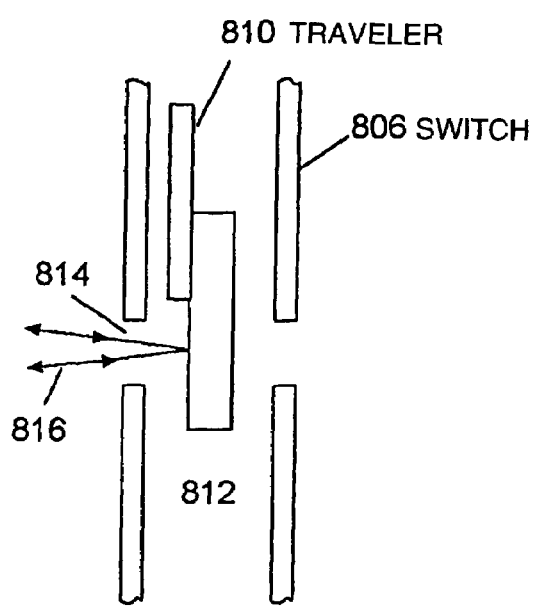 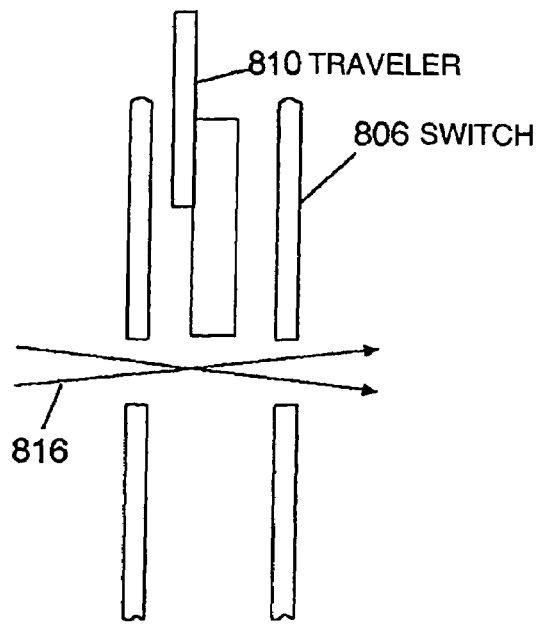
FIG. 9A  FIG. 9B
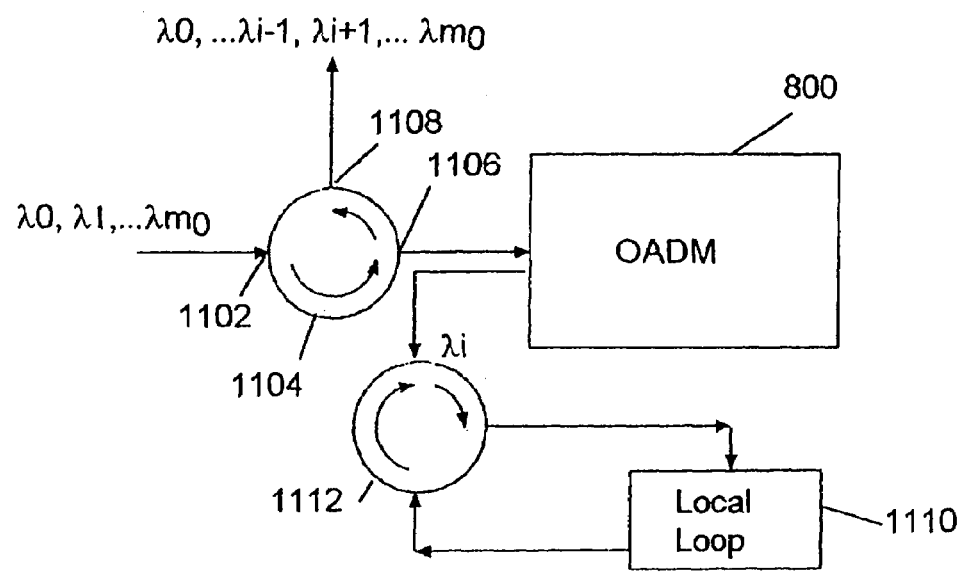
FIG. 11

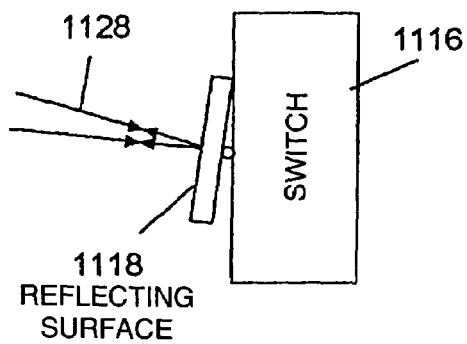
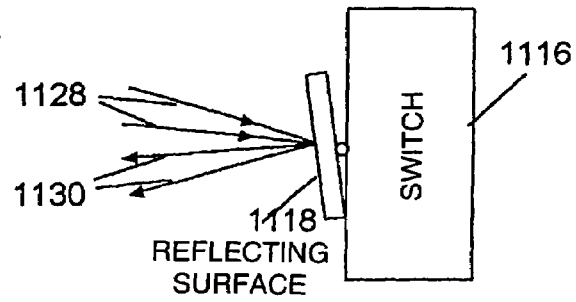
FIG. 14A       FIG. 14B
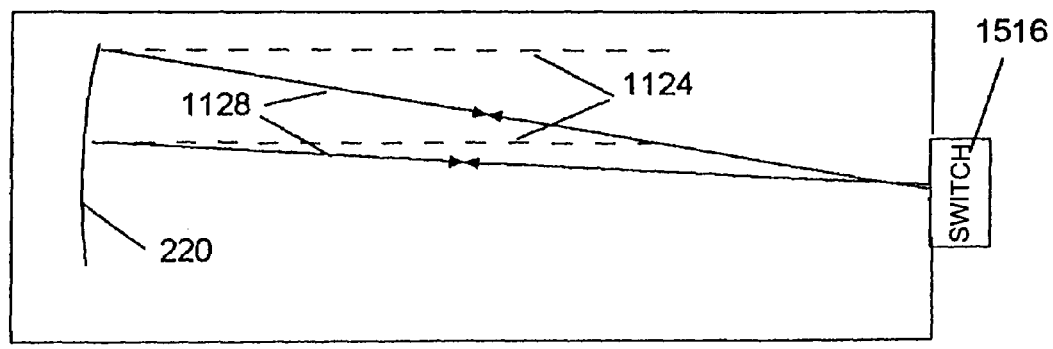
FIG. 15A
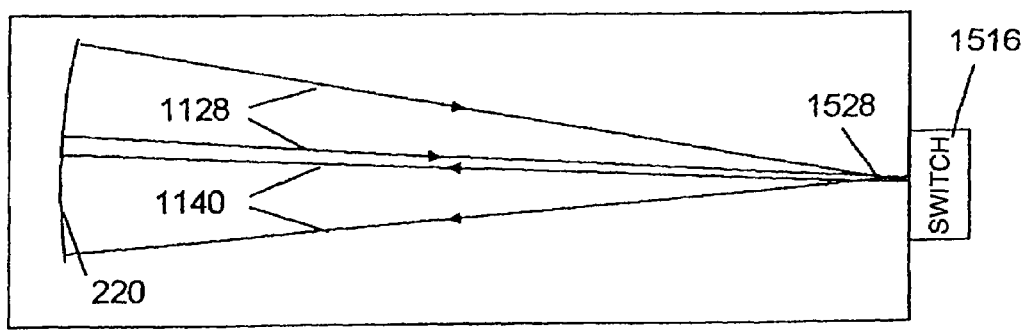
FIG. 15B

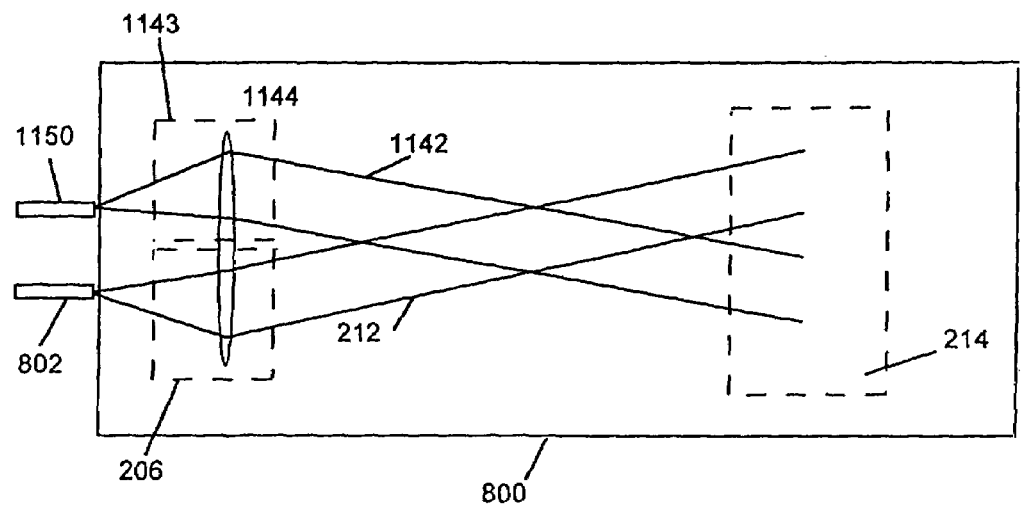
FIG. 16
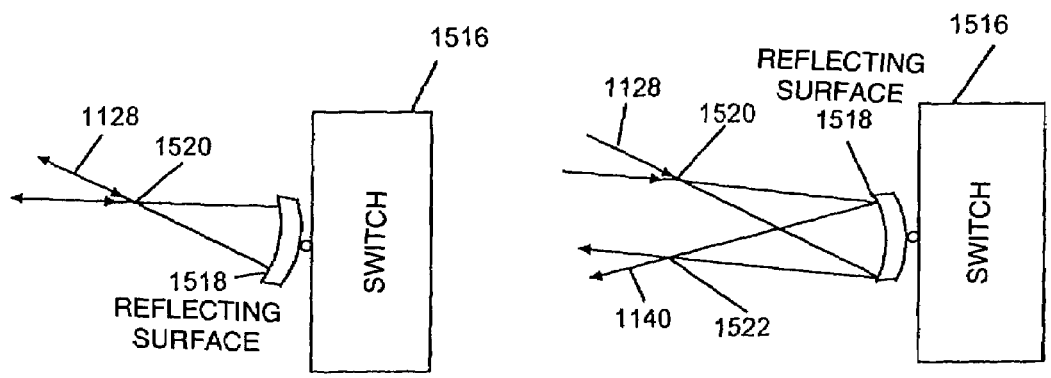
FIG. 17A
FIG. 17B

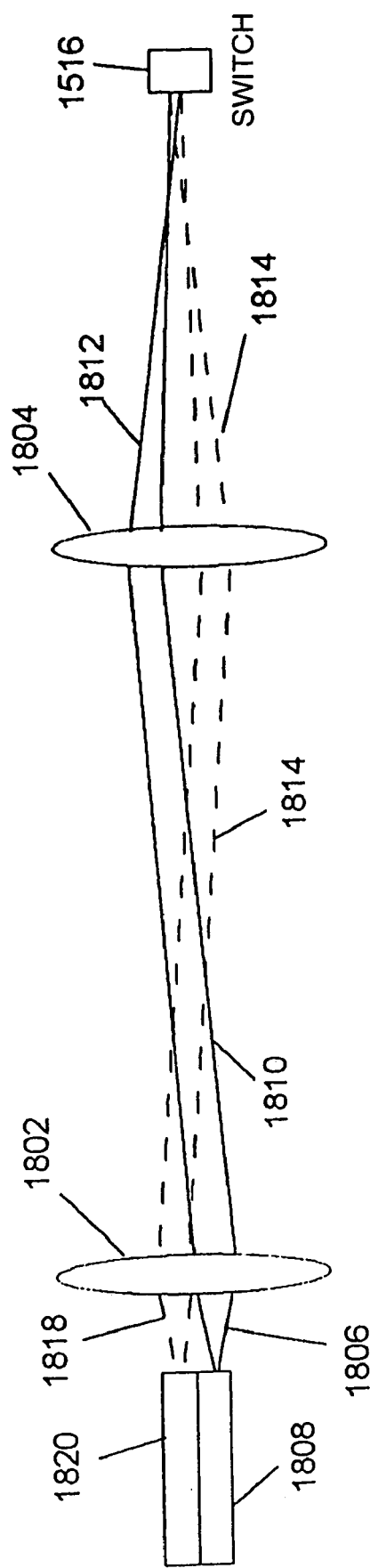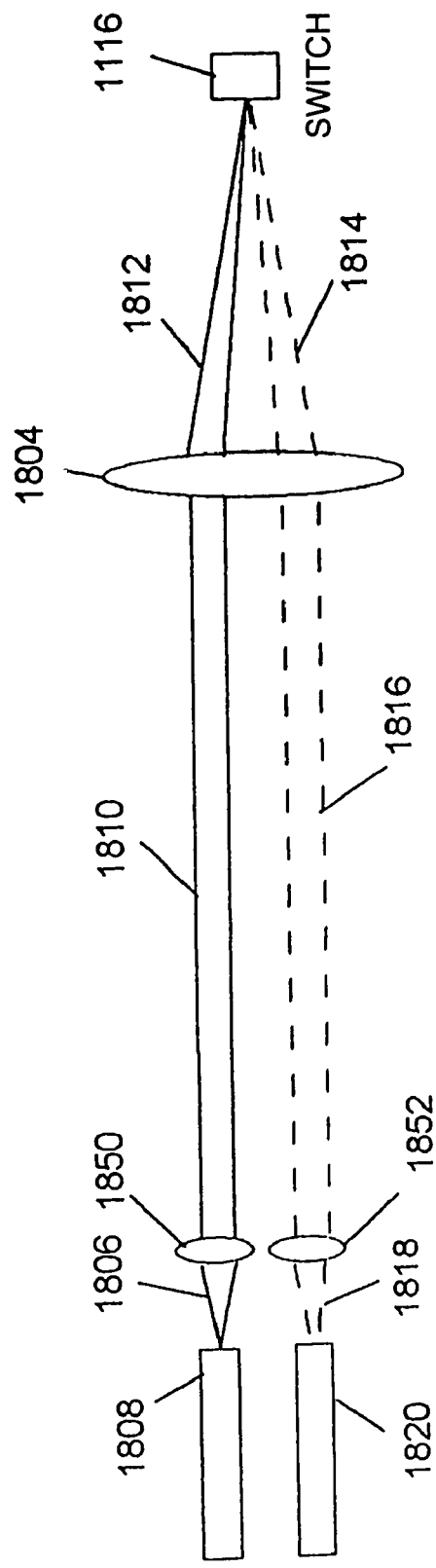
FIG. 18A
FIG. 18B

208 LENS
210 LENS
212 BEAM
214 GRATING
216 GRATING
220 MIRROR
224 LIGHT DISPERSED REGION
2500 HOUSING
2502 FRAME
2504 UPPER RAIL
2506 LOWER RAIL
2508 SLOT
2510 MOUNTING PLATES
2512 PLATE
2514 PLATE
2516 APERTURE
2518 PLATE
2520 ANGLED SURFACE
2522 ANGLED SURFACE
2524 APERTURE
2526 APERTURE
2528 PLATE
2530 APERTURE
2552 UPPER EDGE
2554 LOWER EDGE
2556 APERTURE
2558 AREA

3500 ELECTRONICS PACKAGE
3502 DETECTOR ARRAY
3504 SUBSTRATE
3506 BOARD
3508 FLEXIBLE LINK
3509 CONNECTION PAD
3510 INTEGRAL FRAME
3512 COLLIMATION UNIT
3513 FIBER
3514 COVER
3516 CONDUITS
3518 COVER
3526 ELECTRONIC CIRCUIT
3527 ELECTRONIC CIRCUIT
3528 CONNECTOR
3529 CONNECTOR
3530 LIGHT HANDLING UNIT

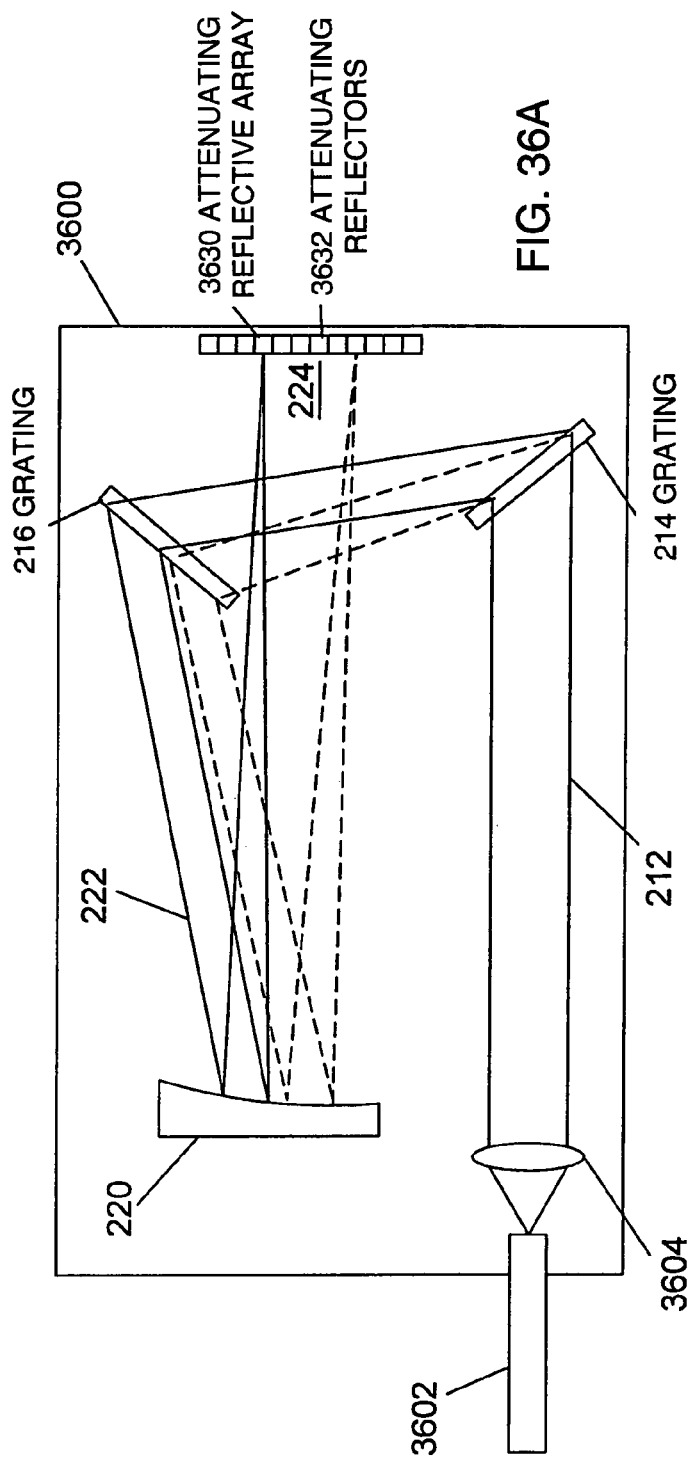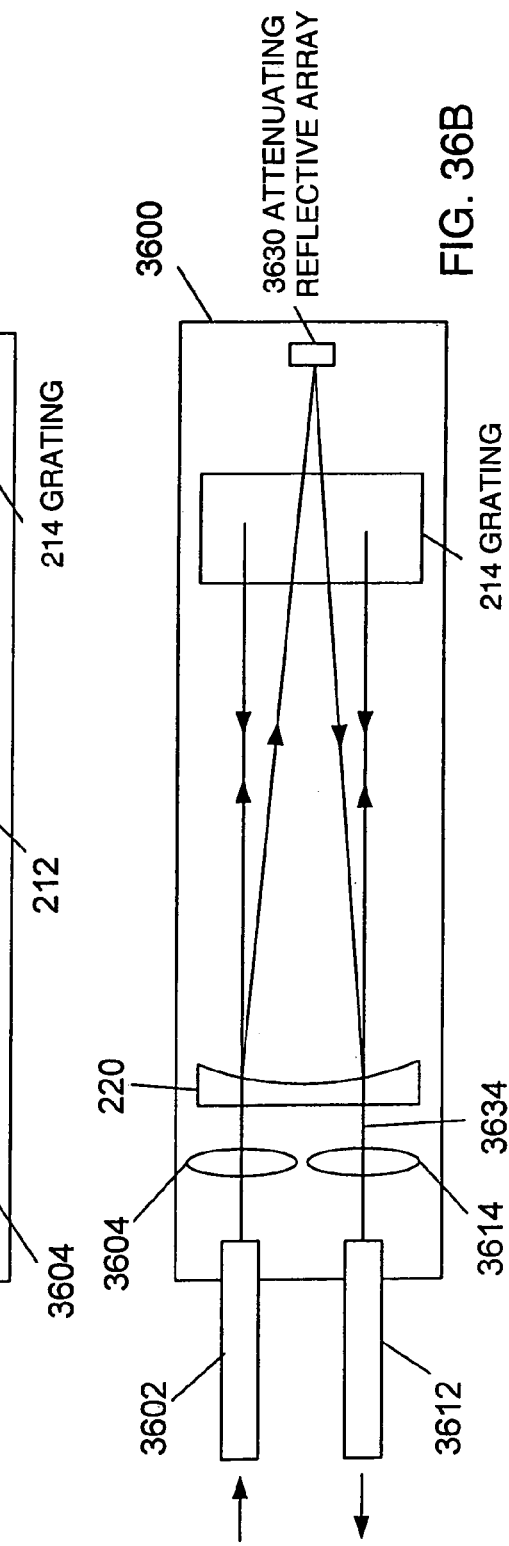

WAVELENGTH DIVISION MULTIPLEXED DEVICE

FIELD OF THE INVENTION

The present invention is directed to a device for use with multiple channel optical communications, and more particularly to a device that is useful for multiplexing/demultiplexing, channel monitoring, add/drop filtering and controlling the power profile of a multiple channel signal.

BACKGROUND

One of the advantages of optical fiber communication is the potential for large information handling capacity. One approach to increasing the optical bandwidth over which information is transmitted in an optical fiber is to use wavelength division multiplexing (WDM) or dense wavelength division multiplexing (DWDM), where light at several different wavelengths is combined and injected into a fiber, the light at each wavelength typically being independently modulated with information prior to combining with the other wavelengths. After propagation through the fiber, the light is then separated into its different wavelength components before detection.

As used herein, the term WDM includes DWDM. The International Telecommunications Union (ITU) has set different WDM standards, that specify the operating wavelengths for the different WDM components, also known as channels. Under these standards, the separation between adjacent WDM channels is typically a fixed frequency. For example the inter-channel spacing may be 100 GHz or 50 GHz.

More information may be transmitted over a fixed bandwidth when the channel separation is smaller, since more channels can fit into the fixed bandwidth. However, it becomes increasingly difficult to multiplex or demultiplex the WDM channels when the frequency separation is smaller. As the pressure for increased fiber information capacity increases, the requirements for that optical WDM components can handle increasing dense multiplexing also increases.

The transmission of a multiple channel signal along a fiber link often introduces wavelength dependent losses or gains, resulting in non-uniform channel power. It is important to be able to monitor the power in different channels using a channel monitor. It is also important to be able to adjust the relative power levels in the different optical channels.

Furthermore, a complex communications network typically does not consist only of point to point links, but includes one or more local loops branching off main trunk fibers. Such local loops permit smaller communities to be attached to the communications network while the trunk fiber passes between major cities. The trunk fiber includes add/drop multiplexers that select one or more channels propagating along the trunk fiber and that add channels to the trunk fiber. Several approaches to add/drop multiplexing are fixed, and permit no change in the selected channel.

SUMMARY OF THE INVENTION

Generally, the present invention relates to a WDM device that is based on the use of at least two transmissive diffraction elements. The WDM device provides flexible use and may be widely applied in WDM systems. The device is useful for multiplexing and demultiplexing, channel monitoring, for adding and dropping channels, and for controlling the power in individual channels within a multiple channel signal. The device provides for dynamic control of individual channels, and may be advantageous in use as a gain flattening filter.

In one particular embodiment, the invention is direction to a channel power control device that includes a first multiple channel port, a second multiple channel port and a dispersion region where individual optical channels propagating from the first optical multiple channel port are spaced apart. A diffraction unit is disposed between the first multiple channel port and the dispersion region and defines wavelength-specific optical paths between the first multiple channel port and respective single channel ports of the plurality of single channel ports. The diffraction unit includes at least first and second transmissive diffraction elements. A plurality of reflectors is positioned in the dispersion region to reflect respective individual optical from the first multiple channel port to the second multiple channel port.

Another embodiment of the invention is directed to an optical communications system that includes an optical transmitter that transmits a multiple channel communications signal, an optical receiver that detect optical signals carried in multiple optical channels and a fiber-optic communications link coupled to transport the multiple channel communications signal from the optical transmitter to the optical receiver. One of the optical transmitter, the optical receiver and the fiber-optic communications link includes a multiple wavelength device having a first multiple channel port, a second multiple channel port and a dispersion region where individual optical channels propagating from the first optical multiple channel port are spaced apart. A diffraction unit is disposed between the first multiple channel port and the dispersion region, and defines defining wavelength-specific optical paths between the first multiple channel port and respective single channel ports of the plurality of single channel ports. The diffraction unit includes at least first and second transmissive diffraction elements. A plurality of reflectors in the dispersion region reflects respective individual optical from the first multiple channel port to the second multiple channel port.

Another embodiment of the invention is directed to a method of adjusting a power profile of a multiple channel communications signal. The method includes diffracting the multiple channel communications signal with a first transmission diffraction element, diffracting light from the first transmission diffracting element with a second transmission diffraction element, and focusing light from the second transmission diffraction element so as to separate individual channel beams at respective reflectors. The method also includes reflecting the individual channel beams with respective reflectors having selected values of reflectivity and diffracting light reflected from the reflectors with the second and first transmission diffraction elements to produce a multiple channel output signal.

Another embodiment of the invention is directed to a device for controlling a multiple channel communications signal. The device includes means for diffracting the multiple channel communications signal with a first transmission diffraction element, means for diffracting light from the first transmission diffracting element with a second transmission diffraction element, and reflector means for reflecting the individual channel beams with respective reflectors having selected values of reflectivity. The device also includes means for focusing light from the second transmission diffraction element so as to separate individual channel beams at respective reflector means, and diffracting light reflected from the reflector means with the second and first transmission diffraction elements to produce a multiple channel output signal.

The above summary of the present invention is not intended to describe each illustrated embodiment or every implementation of the present invention. The figures and the detailed description which follow more particularly exemplify these embodiments.

BRIEF DESCRIPTION OF THE DRAWINGS

The invention may be more completely understood in consideration of the following detailed description of various embodiments of the invention in connection with the accompanying drawings, in which:

FIG. 8 schematically illustrates a double transmission grating optical add/drop multiplexer according an embodiment of the present invention;

FIGS. 9A and 9B schematically illustrate a MEMS transmission switch in reflective and transmissive states respectively;

FIG. 11 schematically illustrates a reflective add/drop multiplexer of the present invention connected to a fiber network;

FIGS. 14A and 14B schematically illustrate an embodiment of a MEMS reflection switch in first and second activation states respectively;

FIGS. 15A and 15B schematically illustrate optical paths within a reflective add/drop multiplexer of another embodiment of the present invention, with a switch in first and second activation states respectively;

FIG. 16 schematically illustrates input and output coupling optics of another embodiment of a reflective add/drop multiplexer of the present invention;

FIGS. 17A and 17B schematically illustrate another embodiment of a MEMS reflection switch in first and second activation states respectively;

FIG. 18A and 18B schematically illustrate equivalent optical paths through embodiments of a reflective add/drop multiplexer according to the present invention, having common and separate focusing elements respectively;

FIGS. 36A and 36B schematically illustrate an embodiment of a static gain flattening filter according to the present invention;

Figure 1:
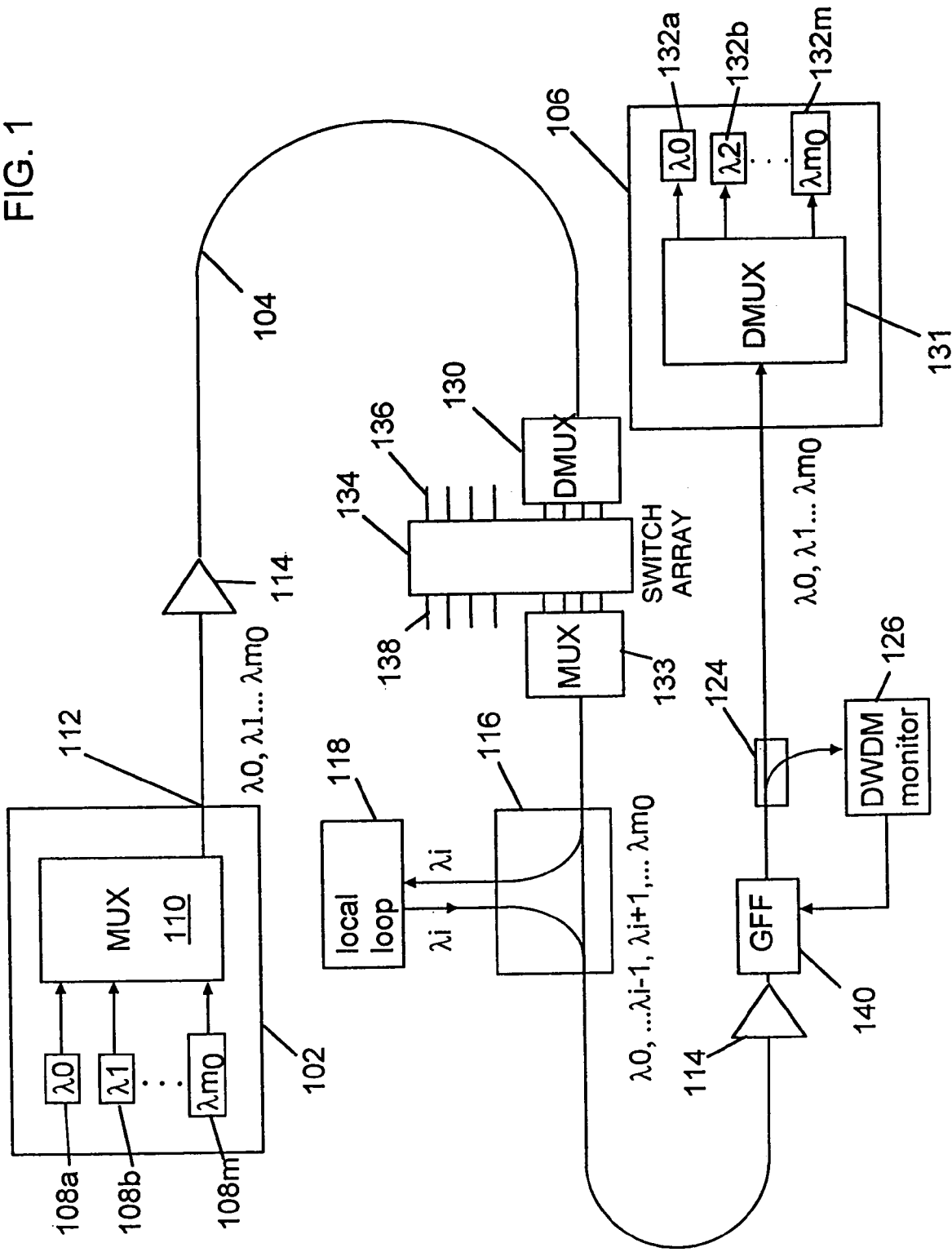
FIG. 1 schematically illustrates a fiber optical communications network.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention as defined by the appended claims.

DETAILED DESCRIPTION

The present invention is applicable to transmission grating spectrometers, and is believed to be particularly useful in dense wavelength division multiplexed (DWDM) applications for optical communications, particular controlling the power profile of a multiple channel optical communications signal.

DWDM communications systems use several channels of light at different optical frequencies. According to the ITU standards, the channels are evenly spaced by frequency. Thus, the mth channel has a frequency given by $v_o+m\Delta v$, where $v_o$ is a lowest channel frequency, $\Delta v$ is the channel separation and m is an integer value ranging from 0 to $m_0$, the upper value. The value of $m_0$ may be any suitable number, for example 19, 39, 79, or higher. According to commonly used ITU standards, the channel separation, $\Delta v$, may be, amongst other values, 100 GHz or 50 GHz. In the following discussion, the different DWDM channels are described in terms of both frequency and wavelength. It will be appreciated that each channel has a unique wavelength and frequency given through the relationship $v_m \cdot \lambda_m = c$, where $v_m$ and $\lambda_m$ are, respectively, the frequency and wavelength of the mth channel, and c is the speed of light.

One particular embodiment of a DWDM optical communications system 100 is illustrated in schematic form in FIG. 1. A DWDM transmitter 102 directs a DWDM signal having $m_0$ channels through a fiber communications link 104 to a DWDM receiver 106.

This particular embodiment of DWDM transmitter 102 includes a number of light sources 108a–108m that generate light at different wavelengths, $\lambda 0, \lambda 1 \ldots \lambda m_0$, corresponding to the different optical channels. The light output from the light sources 108a–108m is combined in a DWDM combiner unit 110, or multiplexer (MUX) unit to produce a DWDM output 112 propagating along the fiber link 104.

Light sources 108a–108m may be modulated laser sources, or laser sources whose output is externally modulated, or the like. It will be appreciated that the DWDM transmitter 102 may be configured in many different ways to produce the DWDM output 112. For example, the MUX unit 110 may include an interleaver to interleave the outputs from different multiplexers. Furthermore, the DWDM transmitter 102 may be equipped with any suitable number of light sources for generating the required number of optical channels. For example, there may be twenty, forty or eighty optical channels, or more. The DWDM transmitter 102 may also be redundantly equipped with additional light sources to replace failed light sources.

Upon reaching the DWDM receiver 106, the DWDM signal is passed through a demultiplexer unit (DMUX) 131, which separates the multiplexed signal into individual channels that are directed to respective detectors 132a–132m.

The fiber link 104 may include one or more fiber amplifier units 114, for example rare earth-doped fiber amplifiers, Raman fiber amplifiers or a combination of rare earth-doped and Raman fiber amplifiers. The fiber link 104 may include one or more DWDM channel monitors 126 for monitoring the power in each of the channels propagating along the link 104. Typically, a fraction of the light propagating along the fiber link 104 is coupled out by a coupler 124 and directed to the DWDM channel monitor 126. The fiber link 104 may also include one or more gain flattening filters 140, typically positioned after an amplifier in the amplifier unit 114, to make the power spectrum of different channels flat. An amplifier unit 114 may include a pre-amplifier and a power amplifier. The gain flattening filter 114 is typically positioned between the preamplifier and power amplifier, although it may also be positioned after the power amplifier. The channel monitor 126 may optionally direct channel power profile information to the gain flattening filter 140 and the gain flattening filter 140 may, in response to the received information, alter the amount of attenuation of different channels in order to maintain a flat channel power profile, or to maintain a desired channel power profile.

The fiber link 104 may include one or more optical add/drop multiplexers (OADM) 116 for directing one or more channels to a local loop. In the particular embodiment illustrated, the OADM 116 drops the ith channel, operating at wavelength $\lambda i$, and directs it to the local loop 118. The local loop 118 also directs information back to the OADM 116 for propagating along the fiber link 104 to the DWDM receiver 106. In the illustrated embodiment, the information added at the OADM 116 from the local loop 116 is contained in the ith channel at $\lambda i$. It will be appreciated that the information directed from the local loop 118 to the OADM 116 need not be at the same wavelength as the information directed to the local loop 118 from the OADM 116. Furthermore, it will be appreciated that the OADM 116 may direct more than one channel to, and may receive more than one channel from, the local loop 118.

The fiber link 104 may also include one or more optical cross-connect switches 134, for connecting to other optical circuits. The WDM signal from the transmitter unit 102 is typically demultiplexed in a DMUX 130 and the demultiplexed signal is then fed into the optical cross-connect switch array 134, which couples signals from the DMUX 130 and from other systems through ports 136. On the output side of the optical cross-connect switch array 134, some output signals are coupled to a MUX 133 that multiplexes the output signals into a WDM signal that is transmitted to the receiver unit 106. Other outputs 138 from the optical cross-connect switch array 134 may be coupled to other systems.

Figure 2:
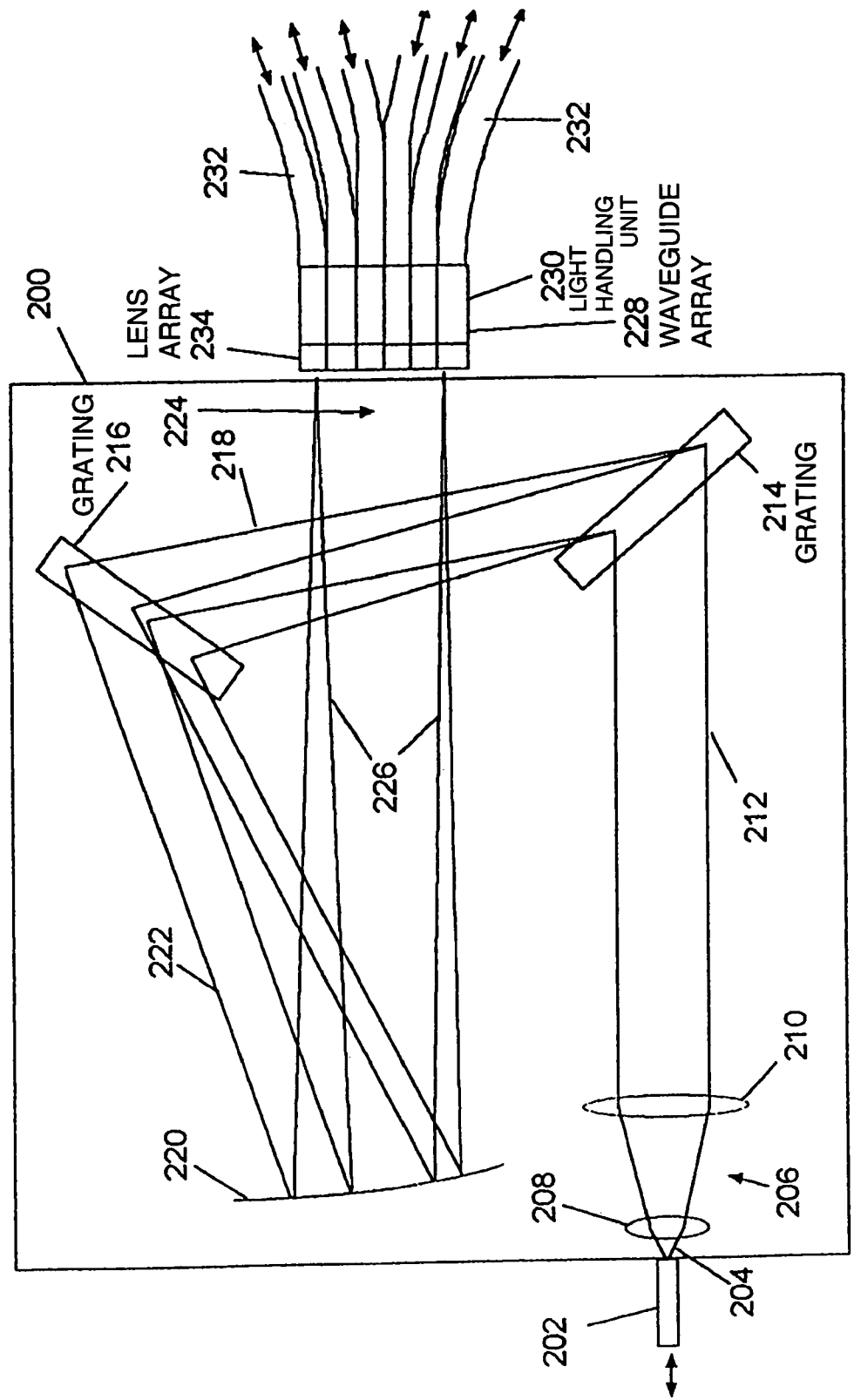
FIG. 2 schematically illustrates a double transmission grating multiplexer according to an embodiment of the present invention.

An embodiment of a double transmission diffraction grating-based WDM device 200 that is useful in DWDM communications is illustrated in FIG. 2. In this particular embodiment, light is typically fed into the device 200 via a waveguide 202, for example an optical fiber, that carries a WDM light signal. The multiple channel light 204 from the fiber 202 is collimated by a collimating/focusing system 206, that may comprise one or more lenses. In the particular embodiment illustrated, the lens system 206 includes a first lens 208 and a second lens 210. The first and second lenses 208 may be cylindrical lenses, spherical lenses or aspherical lenses, or any other suitable type of focusing element.

The collimated light beam 212 is incident on a first transmission diffraction grating 214. The transmission diffraction grating 214 may be formed from glass, and other suitable materials that transmit light at the wavelength range of interest. Such materials may include Si, $SiO_2$, $Si_3N_4$ and SiON. One applicable wavelength range of interest is 800 nm–2000 nm, which covers the range of wavelengths typically selected for optical fiber communications, although it will be appreciated that other wavelength ranges may be used.

The term transmission diffraction grating as used herein refers to structures that diffract light passing therethrough. The transmission diffraction grating may have a strictly periodic structure, known as a linear grating, or may have a structure that is not strictly periodic, termed a nonlinear grating. For example, the structure may have a chirped period, where the period changes from one end of the structure to the other. Use of a chirped grating requires the use of a different focusing element from a linear grating. If there is a substantial variation in the periodicity of the transmission diffraction grating, then the transmission diffraction grating demonstrates focusing capabilities in addition to dispersing the different wavelengths of the light passing therethrough. Such a grating may also be termed a diffractive optical element (DOE). In the following description, the terms transmission diffraction grating refers to both linear and nonlinear gratings. Many of the examples described below illustrate the use of a linear grating, but it will be appreciated by those of ordinary skill in the art that nonlinear transmission gratings may also be used.

One approach to forming a transmission diffraction grating 214 is to etch a slotted structure into a substrate. The depth and length of the slots, and the ratio of the etched slot width to the unetched material width between slots, determine, at least in part, the diffraction properties of the transmission diffraction grating 214. The spatial variation in grating periodicity determines the focusing capabilities of the transmission diffraction grating 214. The transmission diffraction grating 214 may have a diffraction efficiency into the first diffraction order as high as 99.9%. In one embodiment of a grating 214, particularly suitable where the light entering the device 200 is TE polarized, the grating is formed from fused silica, the grating period is 1050 nm, with a groove duty cycle of 51%. The groove depth is about 2 μm and the incident angle on the grating is about 31°. In another embodiment of grating, particularly suitable for randomly polarized light, the groove depth is about 6.7 μm.

The collimated light beam 212 is diffracted by the first transmission diffraction grating 214 towards a second transmission diffraction grating 216 as a singly-diffracted beam 218. The singly-diffracted beam 218 is diffracted by the second transmission diffraction grating 216 towards a focusing optic 220 as a doubly-diffracted beam 222. The first and second transmission gratings 214 and 216 are typically oriented so as to diffract light into the first diffraction order.

Transmission diffraction gratings have advantages over reflection diffraction gratings. For example, the use of a transmission grating provides the designer with more design parameters to adjust in order to obtain optimum operation. The characteristics of a reflection grating are determined by the geometrical shape of the grating. In contrast, the material of the transmission grating may also be used as a design parameter. Another benefit to using a transmission grating is that it may be designed to have a high diffraction efficiency over a broader wavelength range than is typically possible using a reflection grating. In addition, the use of two gratings rather than a single grating is that, where the grating period is constant, the dispersion is increased, and so effective channel separation may be achieved in a smaller device than a single grating device.

The focusing optic 220 directs and focuses the doubly diffracted beam 222 towards a light dispersed region 224. The doubly-diffracted beam 222 includes components 226 of different wavelength, corresponding to different optical channels, that propagate along different paths due to diffraction at the first and second transmission diffraction gratings 214 and 216. By focusing the different wavelength components 226 at the light dispersed region 224, the different wavelength components 226 are physically separated and may subsequently be operated on individually and separately from the other wavelength components 226 by a light handling unit 230. The focusing optic 220 may be a spherical or an aspherical mirror. An aspherical mirror may permit the different channels to be focused at the light dispersed region 224 with uniform spacing, as is discussed further below.

In the illustrated embodiment, the light handling unit 230 is an array 228 of single channel waveguides 232, such as optical fibers. The separation between the cores of adjacent optical fibers 232 may be set to be the same as the spatial separation of the individual channels at the light dispersed region 224. Thus, individual channels may be matched to respective fibers 232. Where aspheric focusing optics are used, the separation between fibers 232 may be uniform. However, the separation between fibers 232 need not be uniform, and may be set to match the dispersion of the different channels at the light dispersed region. A lens array 234 may be positioned so that the individual lenses of the lens array focus each channel into its respective fiber 232. An advantage provided by the lens array is an increase in coupling efficiency into the fibers 232. The spacing of the lenses on the lens array is typically arranged to match the spacing of the fibers 232. Therefore, if the fibers 232 are uniformly spaced, the lenses of the lens array 234 are typically uniformly spaced. On the other hand, if the fiber spacing is non-uniform, then the lens spacing is typically non-uniform in a manner that matches the nonuniformity in the fiber spacing.

Therefore, where a multiple channel signal propagates into the device 200 through fiber 202, light of individual channels propagates away from the device along individual fibers 232. It will be appreciated that in such a configuration, the device 200 operates as a demultiplexer (DMUX).

It will be appreciated that, if single channel light is directed along the fibers 232 towards the device 200, then the light at the different channels may be combined by the transmission diffraction gratings 216 and 214 to produce a multiple channel output signal at the fiber 202. In such a configuration, the device 200 operates as a multiplexer (MUX).

It will also be appreciated that the device 200 may accommodate a large number of optical channels, with a requisite number of fibers in the fiber array 228, and is not restricted to using only six channels into six fibers as illustrated in the figure.

Figure 3:
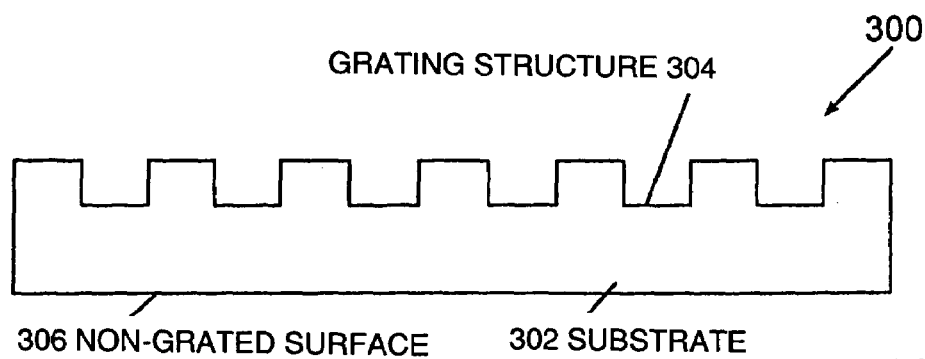
FIG. 3 is a schematic cross-sectional view of one embodiment of a transmission grating, according to the invention.

An example of a transmission grating 300 suitable for use in the device 200 is illustrated in FIG. 3. The transmission grating 300 includes a substrate 302 that defines a grating structure 304. In operation, may be incident on a non-grated surface 306 of the substrate 302 and transmitted through the substrate 302 and diffracted by the grating structure 304. Light may also be incident on the grating structure 304 and then pass through the non-grated surface 302. This operation contrasts with a reflection grating in which light is incident on the surface containing the grating structure and is reflectively diffracted away from that surface.

The transmission grating 300 optionally may include an antireflection coating (not shown) on the non-grated surface 306 to reduce reflection of incident light at that surface. Typically, any antireflection coating material can be used although, preferably, the antireflection coating has little or no absorption in the wavelength region of light diffracted by the transmission grating 300.

Figure 4:
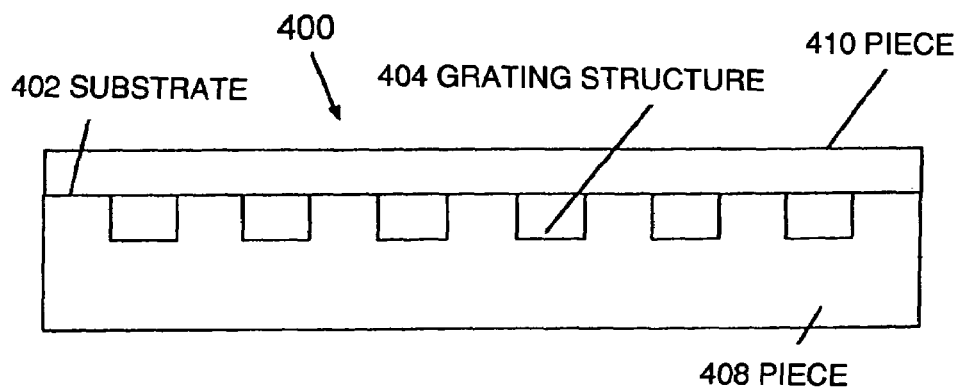
FIG. 4 is a schematic cross-sectional view of a second embodiment of a transmission grating, according to the invention.
Figure 5:
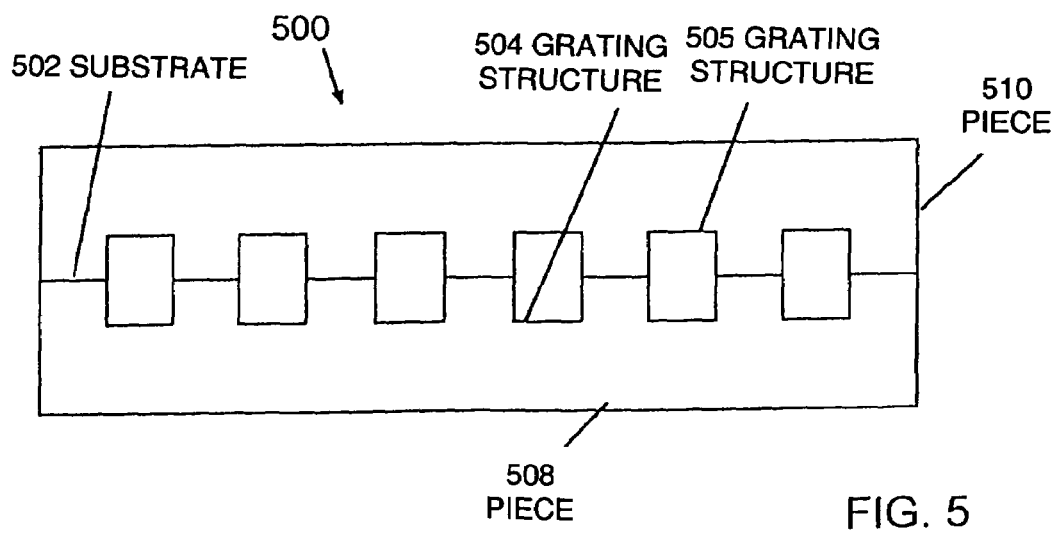
FIG. 5 is a schematic cross-sectional view of a third embodiment of a transmission grating, according to the invention.

Light incident on the transmission grating at an angle, cc, from an axis perpendicular to the non-grated surface, in other words perpendicular to a normal to the grating, is typically diffracted from the grating surface according to the diffraction equation:

$$m\lambda = d(n_{in} \sin \alpha + n_{out} \sin \beta) \quad (1)$$

where m is an integer ( . . . , −2, −1, 0, 1, 2, . . . ) representing the diffraction order, λ is the wavelength of the incident light, d is the period of the grating, and β is the angle from the grating normal at which the light is diffracted. The refractive indices $n_{in}$ and $n_{out}$ are the refractive indices of the input medium and output medium respectively. Where the transmission grating 300 is used in air, then $n_{in}=n_{out}=1$. The separation of light at different wavelengths by the transmission grating 300 is also termed dispersion. Where d is constant across the substrate, the grating is a linear grating. The period, d, may have a functional dependence on spatial position on the substrate, in which case the grating is termed a nonlinear grating. Only a linear grating is illustrated in FIGS. 3–5, but it will be appreciated that nonlinear gratings may also be used.

By proper choice of incident light angle according to equation (1), several monochromatic light beams, for example different optical channels, may be combined into a polychromatic light beam using the transmission grating. In such an operation, the incident angles, $\alpha_1, \alpha_2, \ldots$, are selected so that β is approximately the same for each channel.

Any suitable grating profile may be used, including, for example, triangular, square or rectangular well (shown in FIG. 3), blazed, and sinusoidal grating structures. The structural parameters of the grating structure may be selected to obtain the desired diffraction properties. The structural parameters include i) the grating period, in other words the average center-to-center inter-well spacing, which is convertible to the number of grating lines per mm; ii) the aspect ratio, in other words, the well width divided by the well depth; iii) the duty cycle, in other words the width of the tooth (between wells) divided by the grating period; iv) the angle of blazing for blazed gratings, and v) grating chirp, the variation of period along the length of the grating. The embodiment of grating 300 illustrated in FIG. 3 has a duty cycle of 50%. In addition, spatial variations in the periodicity across the substrate may give rise to focusing effects.

In some embodiments, the parameters of the grating are selected to result in at least 50%, 75%, or 90% or more of the incident light being diffracted into a single diffraction order. The diffraction of light into a single diffraction order or a small number of diffraction orders may be modeled using a commercial grating design modeling program, such as Gsolver, available from Grating Solver Development Company, Texas. The design of the grating is typically optimized for high, uniform diffraction efficiency over the bandwidth of interest, for example the erbium C-band, L-band or both. Maximum diffraction efficiency is typically set for the center wavelength of the desired band.

In addition, in some embodiments, the structural parameters of the grating may be selected so that the diffraction efficiency for the TE and TM polarization states of the incident light is within no more than 10% or 5%. Other examples of transmission diffraction gratings are described in U.S. patent application Ser. No. 09/789,888, entitled "Grating structures and Methods of Making the Grating Structures", filed on even date herewith by J. Holm, H. Madsen, S. Weichel, P. E. Ibsen and B. Rose, Attorney Docket No. 2316.1375US01, and incorporated herein by reference.

The substrate used to form the transmission grating is typically formed using a material that is transparent to the wavelengths of light to be diffracted. The absorption in the transmission grating 300 is typically less than 5% and preferably less than 1%. Suitable materials for diffraction of light in the 1.3 μm–1.6 μm wavelength range typically used for fiber optical communications include, for example, quartz, silicon, and silicon nitride. Other suitable materials include, for example, plastics and other materials suited for replication.

The grating structure may be formed using a variety of different techniques. One technique includes mechanical ruling using a stylus or other ruling device having a hard tip, such as diamond or silicon carbide. Other techniques include the use of photolithographic methods, such as standard lithography, those using a holographic mask, near-field holography and direct holographic exposure to form a grating pattern in a photoresist material deposited on the substrate. The substrate can then be etched according to the grating pattern using any wet or dry etching techniques to form the grating. Appropriate wet and dry etching techniques and etchants typically depend on the material used for the substrate. Some examples of photolithographic methods suitable for forming a diffraction grating are discussed in U.S. patent application Ser. No. 09/789,888.

Another example of a suitable transmission grating 400 is illustrated in FIG. 4. This transmission grating 400 includes a grating structure 404 disposed internally within a substrate 402. In one embodiment, the substrate 402 includes a first piece 408, containing the grating structure 404 formed on a surface, and a second piece 410. The first and second pieces 408, 410 can be combined together to form the substrate 402 using a variety of techniques. For example, the first and second pieces 408, 410 may be bonded or adhesively coupled using an optical adhesive; the two pieces 408 and 410 may be reactively bonded using reactive groups on the surface of the two pieces that are, optionally, photochemically or thermally activated; or the two pieces can be mechanically coupled using a clamp or other fastener to hold the pieces together. Methods of bonding or otherwise attaching the first and second pieces 408 and 410 are discussed in U.S. patent application Ser. No. 09/789,888. The two pieces 408 and 410 may also be assembled by optically contacting polished surfaces. As another example, the second piece 410 may be formed by deposition of material over and, optionally, within the grating structure. Suitable deposition techniques include, for example, chemical vapor deposition (CVD), physical vapor deposition, sputtering, and the like.

In some embodiments of the structure illustrated in FIG. 4, the material used for the first and second pieces 408,410 of the substrate 402 is the same. In other embodiments, the materials are different.

The two pieces 408, 410 may have the same thickness or a different thickness. If the two pieces 408, 410 are made of the same material and have the same thickness, the position at which the light exits the transmission grating 400 will be substantially independent of the temperature of the grating 400, where the light is incident on the grating at the Bragg angle. The Bragg angle is that angle of incidence which produces a diffracted beam whose output angle is equal to the angle of incidence.

In another embodiment, illustrated in FIG. 5, the grating structure 504, 505 is formed in both of the first and second pieces 508, 510 and the two grating structures 504 and 505 are aligned to form a single grating having a depth greater than either of the two individual grating structures. This procedure may be used to form a grating having deep wells or a large aspect ratio.

One advantage of the transmission gratings of FIGS. 4 and 5 is that the grating structure is within the substrate. This prevents foreign matter from entering the grating grooves and avoids degradation of the grating due to exposure to outside elements. This approach also permits higher diffraction efficiency for a broader range of grating parameters. The two outer surfaces through which the light passes may both be antireflection coated in order to reduce loss.

Figure 6:
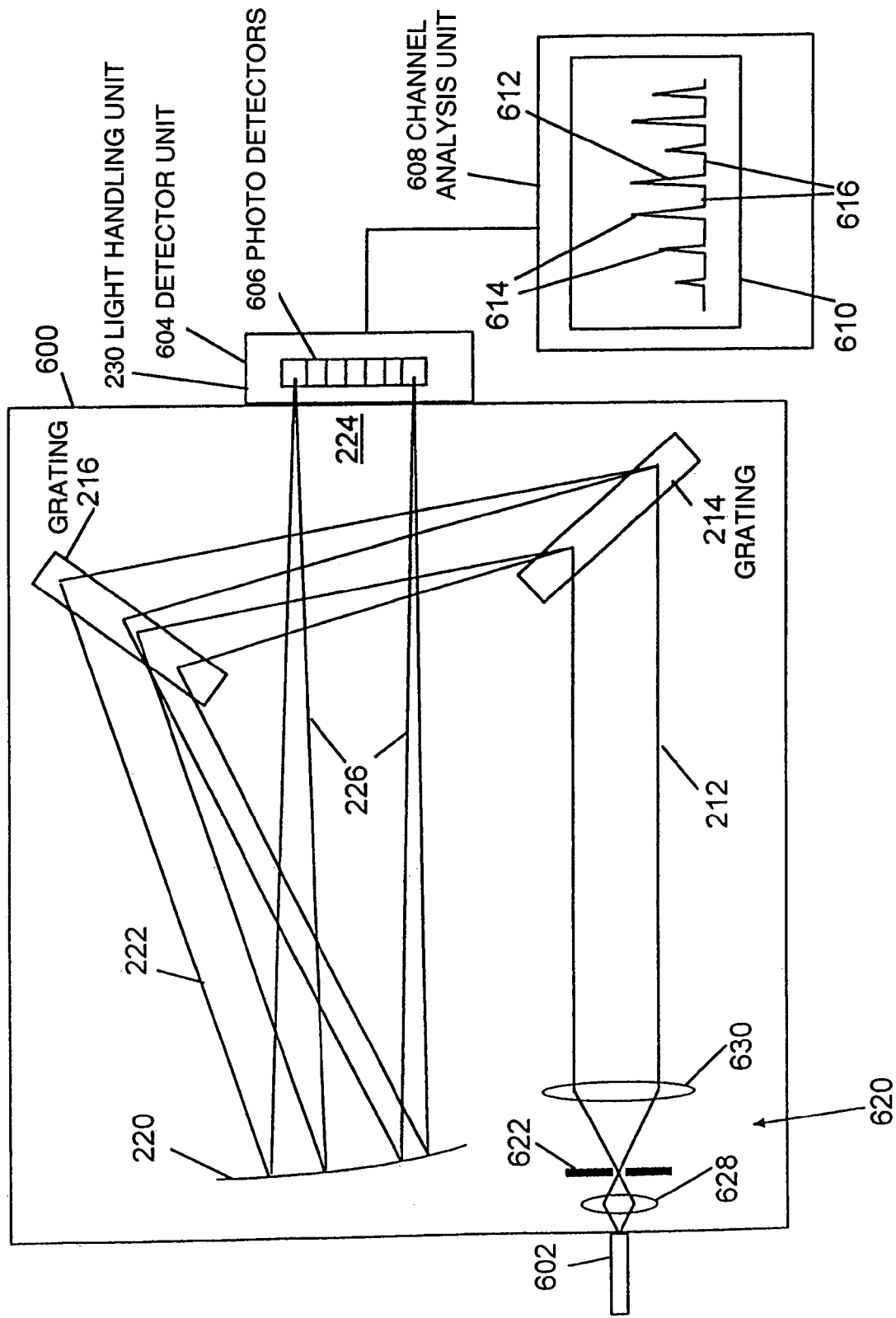
FIG. 6 schematically illustrates a double transmission grating channel monitor according to an embodiment of the present invention.

The device 200 is useful for other applications, in addition to multiplexing and demultiplexing. Another particular embodiment of the device 600 is illustrated in FIG. 6, which shows a double transmission diffraction grating device 600 that is useful for channel monitoring. Like components are numbered with the same numbers as before. A multiple channel signal is fed into the device 600 from a fiber 602. The multiple channel signal is separated into its constituent channel components at the light dispersed region 224.

The light handling unit 230 is a detector unit 604 disposed at the light dispersed region 224 to detect the power level in each channel. The detector unit 604 typically includes a number of individual photodetectors 606. The photodetectors 606 may be individual photodiodes, each photodiode arranged to detect light in its respective channel and producing its own analog output. This approach is suitable for monitoring the power in each channel. The photodetectors 606 may also comprise an integrated photodetector array, for example an integrated array of photodiodes or charged coupled devices. Such an integrated array typically includes a large number of pixels, for example up to 256 pixels, or higher. The use of an integrated array not only permits power monitoring, but also permits wavelength measurement of the individual channels, and also permits the measurement of noise between the channels.

The output from the detector unit 604 is directed to a channel analysis unit 608, that analyzes the signals from the photodetectors 606. In the illustrated embodiment, the channel analysis unit 608 includes a display 610 showing a signal 612 such as might be generated using an integrated photodiode array. The signal 612 shows individual peaks 614 corresponding to the individual channels. The heights of the peaks 614 indicate the power level in each channel. The position across the screen 610 of each peak 614 indicates its respective wavelength. The regions 616 between the peaks show whether there is any interchannel noise.

The device 600 may be used as a channel monitor for monitoring the power levels in each channel. This is useful for monitoring gain equalization in fiber amplifiers, fault detection in optical add/drop multiplexers (OADMs), and power equalization near transmitters and/or OADMs.

The device 600 may be provided with a focusing/collimating unit 620 that provides spatial filtering to the light entering the device 600 from the fiber 602. In the particular embodiment illustrated, the focusing/collimating unit 620 includes a first lens 628 for focusing the light for the fiber 602 through an aperture plate 622 to a collimating lens 630. The collimating lens 630 collimates the light to produce the collimated beam 212. It will be appreciated that other configurations of spatial filters may be used in the focusing/collimating unit 620. An advantage of using a spatial filter is that it reduces the possibility of stray light entering the monitor device, and thus enhances the signal to noise ratio of detection signals produced by the detector unit 604.

It will be appreciated that a spatial filter may be provided in the other embodiments of device discussed herein, and that light may pass through the spatial filter in both directions. Thus, a spatial filter may also be provided to an input to a MUX/DMUX or add/drop multiplexer device.

Figure 7:
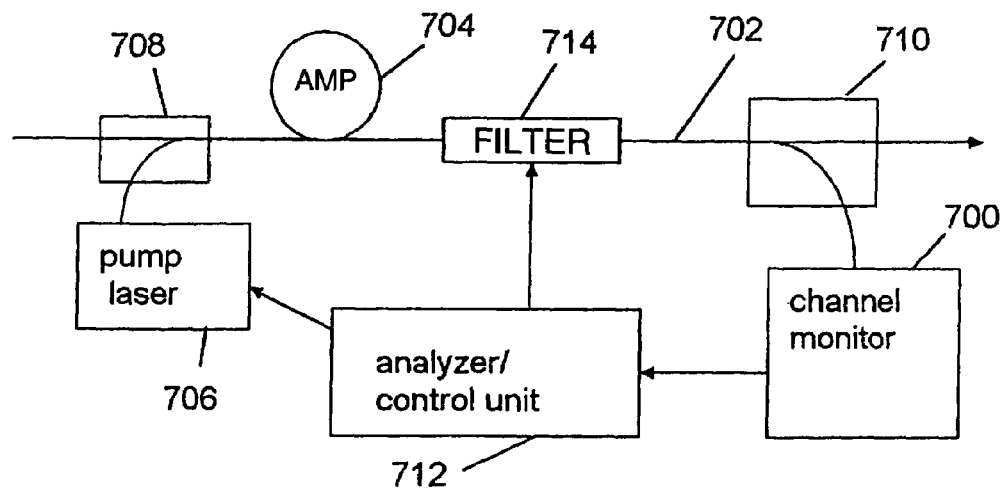
FIG. 7 schematically illustrates a system for controlling spectral flatness in a DWDM signal using the channel monitor illustrated in FIG. 6.

One particular application for a channel monitor 700 is illustrated in FIG. 7. A fiber 702 includes a fiber amplifier 704, such as an erbium-doped fiber amplifier or a Raman fiber amplifier. Pump light is generated by one or more pump lasers 706 and is coupled into the fiber 702 via a coupler 708. A portion of the amplified signal is coupled out of the fiber 702 by the coupler 710 and directed to the channel monitor 700. The channel monitor 700 detects the power levels of the individual channels propagating along the fiber. The process of amplification in the amplifier 704 may favor some channels over others, with the result that the favored channels have power levels greater than the power levels of other channels. It is often preferred that the power levels of the different channels be uniform, in order to keep the power spread among the channels within the receivers' dynamic range.

The channel monitor 700 feeds a monitor signal to the analyzer/control unit 712, which analyzes the monitor signal. The analyzer/control unit 712 may then change the wavelength or pump power of one or more of the pump lasers 706 in order to change the net gain profile for the amplifier 704, in order to make the individual channel powers more uniform. The analyzer/control unit 712 may also adjust the losses in a programmable gain flattening filter 714, which introduces losses to the most intense channels, thus flattening the power profile over the multiple channels in the fiber 702. The gain flattening filter 714 may be positioned before or after the amplifier 704.

The dual transmission diffraction grating device may also be used as an optical add/drop multiplexer (OADM). One such embodiment of an OADM device 800 is illustrated in FIG. 8. Multiple channel light typically enters the device 800 from a fiber 802. The separated channels at the light dispersed region 224 are incident on the light handling unit 230 which includes a switch unit 804 containing a number of optical switches 806 for all, or a selected number, of respective channels. Lenses, for example in the form of a microlens array, may be positioned before the optical switches 806. A control unit 810 is coupled to the switch unit 804 to control the activation states of the switches 806, thus providing programmability to the OADM device 800. Each switch 806 is positioned so as to lie on the path of its respective channel. In the particular embodiment shown, the switches 806 are reflection/transmission switches, that either transmit light to associated fibers 808, or reflect the light back along the path to the fiber 802.

One particular example of a transmission switch is illustrated in FIGS. 9A and 9B. The switch 806 may be a micro-electromechanical system (MEMS) device that includes a traveler 810 that can be moved between a first position, illustrated in FIG. 9A, and a second position, illustrated in FIG. 9B. A reflective element 812, for example a mirror, is attached to the traveler 810. When the traveler 810 is in the first position, the reflective element 812 occludes the aperture 814 through the switch 806, and reflects light 816 incident thereon back through the OADM device 800. The reflective element 812 may retroreflect the light back to the input, in which case the light thus reflected exits the device 800 through the fiber 802. When the traveler 810 is in the second position, shown in FIG. 9B, the reflective element 812 is removed from blocking the aperture 814, and the light is transmitted through the switch 806. Since each switch 806 is associated with its own channel, the channels may be switched independently to be either transmitted or reflected within the OADM device 800. Light transmitted through the switch 806 may enter a respective fiber 808 associated with that channel. The switch 806 may be, for example, a sliding mirror switch like the Optical Switch Chip manufactured by Cronos, Research Triangle Park, N.C.

Figure 10:
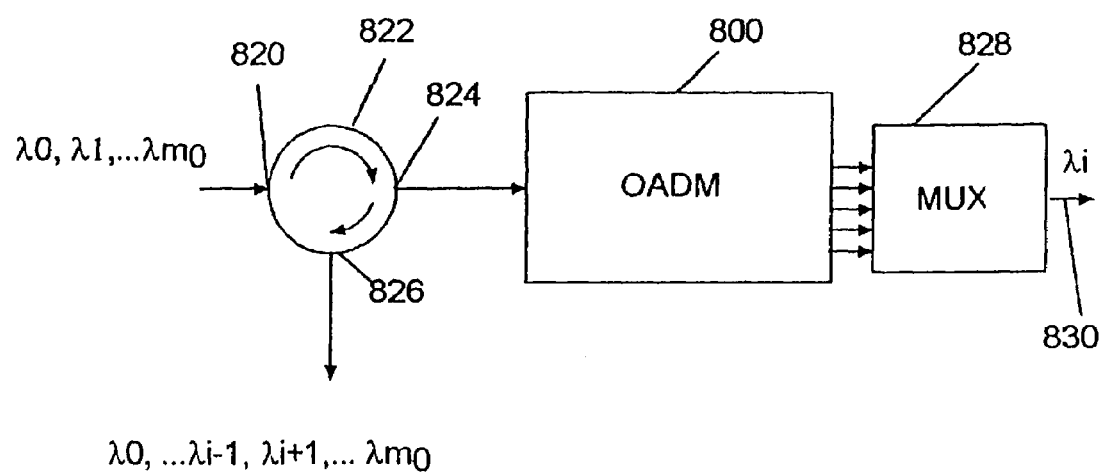
FIG. 10 illustrates the add/drop multiplexer of FIG. 8 connected to a fiber network.

An optical arrangement for the OADM device 800 is illustrated in FIG. 10, that permits the OADM device 800 to operate within a fiber network. Multiple channel light enters the first port 820 of a circulator 822, exits from the second port 824 of the circulator 822, and is passed to the OADM device 800. The OADM device 800 transmits one or more selected channels and reflects the remaining channels. In the illustration, the OADM device 800 transmits the ith channel, at a wavelength $\lambda i$, and reflects the remaining channels, at wavelengths $\lambda 0 \ldots \lambda i-1, \lambda i+1 \ldots \lambda m_0$. The reflected channels are presented to the second port 824 of the circulator 822 and are output from the third port 826 of the circulator 822.

The transmitted channels may be passed into a MUX 828, where they are multiplexed into a single output signal 830. The MUX 828 may be any suitable type of DWDM device, including a MUX as illustrated in FIG. 2, placed back to back with the OADM device 800.

Another embodiment of an OADM 800 is illustrated in FIG. 11, in which the switch unit 804 includes reflective switches, rather than transmissive switches. In this embodiment, the selected channels are not transmitted out of the light dispersed region 224, but are reflected along a different path within the OADM 800, and are typically output at the same end of the OADM 800 as the input.

In this embodiment, a multiple channel signal enters the first port 1102 of a circulator 1104. The multiple channel signal, for example containing wavelengths $\lambda 0-\lambda m_0$, is transmitted to the OADM device 800 from the second port 1106 of the circulator 1104. Channels reflected from the OADM device 800 pass back to the second port 1106 of the circulator 1104 and are transmitted out of the third port 1108. In the illustrated example, the OADM drops the ith channel, at wavelength $\lambda i$, and reflects all the other channels to the circulator 1104. The output from the third circulator port 1108 includes wavelengths $\lambda 0 \ldots \lambda i-1, \lambda i+1 \ldots \lambda m_0$. The dropped channel, at wavelength $\lambda i$, or channels, may be directed to a local loop 1110.

It will be appreciated that the OADM device 800 may be operated in reverse to add a channel. In such a case, the dropped channels may be directed to the local loop 1110 through a circulator 1112. The circulator 1112 permits the local loop to send information at the dropped channel wavelengths back to the OADM device where they are added to the undropped channels. In such a case, the output from the third port 1108 of the circulator 1104 contains all the undropped channels as well as the channels added from the local loop 1110.

Figure 12A:
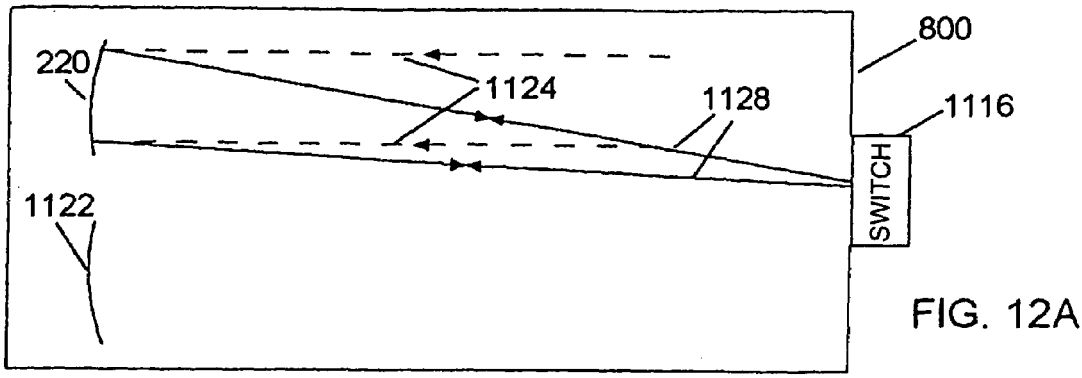
FIGS. 12A and 12B schematically illustrate optical paths within a reflective add/drop multiplexer of an embodiment of the present invention with a switch in first and second activation states respectively.
Figure 12B:
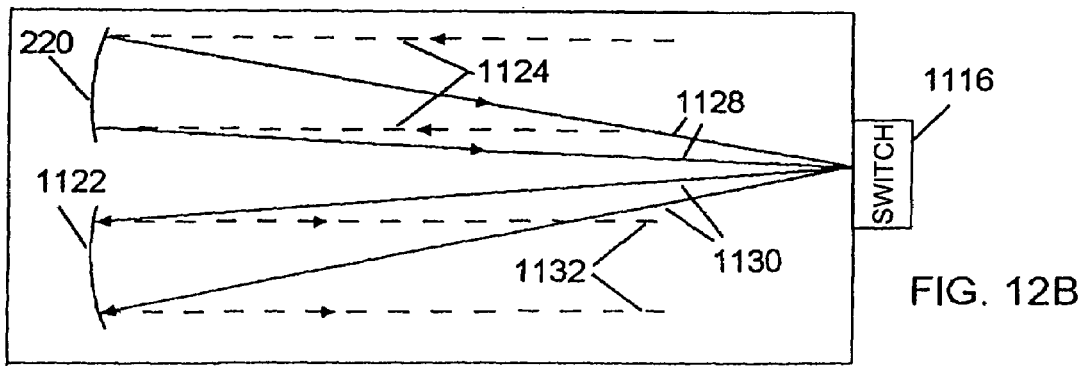

A cross-section AA' through the device 800 having reflective optical switches is illustrated in FIGS. 12A and 12B. In this embodiment, the device 800 includes two separate focusing mirrors 220 and 1122. Multiple channel light, shown by dashed lines 1124, from the multiple channel input fiber 802, is incident on the first mirror 220 and focuses individual channels to their respective switches 806. The figure shows the separated light 1128 for a single channel (shown in solid lines) being focused by the first mirror 220 to its respective switch 1116. When the switch 1116 is in a first position, the switch reflects the light 1128 back along the same path, as illustrated in FIG. 12A. When the switch 1116 is in a second position, as illustrated in FIG. 12B, the incident light 1128 is directed to the second mirror as deflected light 1130. The deflected light 1130 is collimated by the second mirror 1122 as deflected, collimated light 1132, shown by dashed lines.

Figure 13:
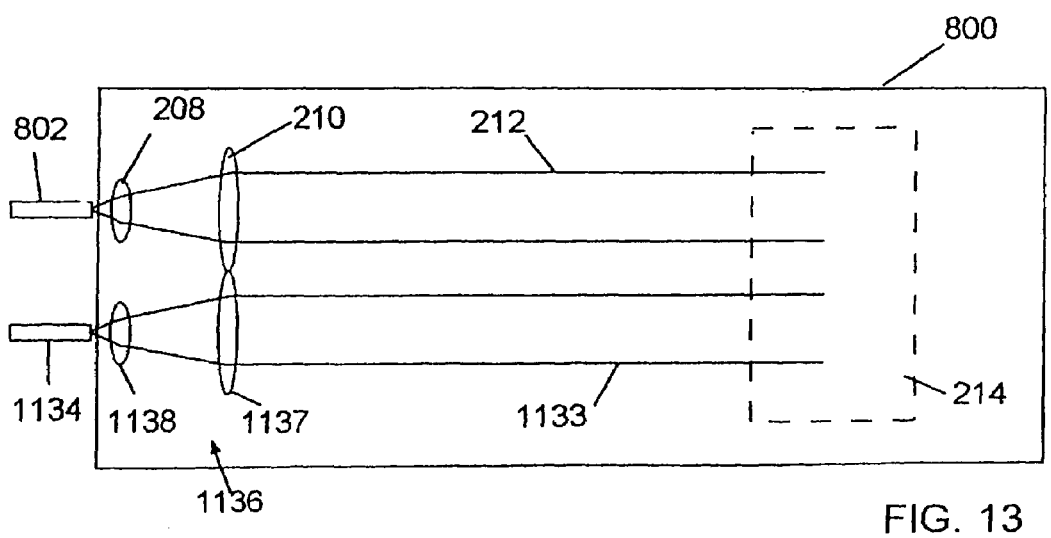
FIG. 13 schematically illustrates input and output coupling optics of an embodiment of a reflective add/drop multiplexer of the present invention.

The deflected, collimated light 1132 passes through the two transmission diffraction gratings 216 and 214, as selected light beam 1133. This is shown in FIG. 13, which schematically illustrates the cross-section BB' of the device 800. The selected light beam 1133, containing those channels switched by switches 1116, is directed from the transmission grating 214 (shown in dashed lines) to a second focusing system 1136. The second focusing system may include one or more lenses. In the illustrated embodiment, the focusing system includes two lenses 1137 and 1138. Those channels not selected by the switches 1116 are retroreflected by the switches 1116 along their original paths to the input fiber 802.

It will be appreciated that the selected light beam 1133 may originate from a reflection from switch 1116 to the second focusing mirror 1122, or from a reflection from switch 1116 to a region on the focusing mirror 220 that is different from the region illuminated by the beam 1124.

An embodiment of a reflective switch 1116 that may be used in the OADM illustrated in FIGS. 11–13 is illustrated in FIGS. 14A and 14B. The switch 1116 may be a MEMs device having a reflecting surface 1118 that can be moved between at least two positions. The reflecting surface 1118 is typically positioned at the focus of the light 1128. In the first position, illustrated in FIG. 14A, incoming light 1128 is reflected back along its incident path. In the second position, illustrated in FIG. 14B, the reflecting surface 1118 is directed so that the incident light 1128 is reflected as deflected light 1130 along a different path from the incident light 1128.

Another embodiment of a reflecting OADM 800, in which the OADM 800 includes a single focusing mirror 220 and a collimating/focusing system 206 common to both the input and the selected output, is illustrated in FIGS. 15A and 15B, which shows the cross-section AA'. In this particular embodiment, the switches 1516 are placed further away from the mirror 220 than the focus of the light 1528. Multiple channel light, shown by dashed lines 1124, from the multiple channel input fiber 802, is incident on the mirror 220 and focuses individual channels to their respective switches 806. The figure shows the separated light 1128 for a single channel, solid lines, being focused by the first mirror 220 to its respective switch 1516. When the switch 1516 is in a first position, the switch 1516 reflects the light 1128 back along the same path, as illustrated in FIG. 15A. When the switch 1516 is in a second position, as illustrated in FIG. 15B, the incident light 1128 is directed to the mirror 220 as deflected light 1140 along a different path.

The deflected, collimated light 1140 passes through the two transmission diffraction gratings 216 and 214, as selected light beam 1142. This is illustrated in FIG. 16, which schematically illustrates the cross-section BB' of the device 800. The selected light beam 1142, containing those channels switched by switches 1516, is directed from the transmission grating 214 (shown in dashed lines) to a second focusing system 1143. The second focusing system may include one or more lenses. In the illustrated embodiment, the first and second focusing systems 206 and 1143 that includes a common lens 1144. Those channels not selected by the switches 1516 are retroreflected by the switches 1516 along their original paths to the input fiber 802.

An embodiment of a reflective switch 1516 that may be used in the embodiment of OADM of in FIGS. 15 and 16 is illustrated in FIGS. 17A and 17B. The switch 1516 may be a MEMs device having a reflecting surface 1518 that can be moved between at least two positions. The switch may be, for example, a linear MMDM (micromachined deformable mirror) supplied by Flexible Optics BV, Netherlands.

The reflecting surface 1518 is typically positioned beyond the focus of the light 1128. The reflecting surface 1518 is curved so as to match the radius of the wavefronts of the light from the focus 1520. In the first position, illustrated in FIG. 17A, incoming light 1128 passes through the focus 1520 and is reflected back along its incident path. In the second position, illustrated in FIG. 17B, the reflecting surface 1518 is directed so that the incident light 1128 is reflected as deflected light 1140 along a different path from the incident light 1128. The deflected light 1140 passes through a different focus 1522.

A schematic representation of the unfolded optical path through the OADM device using the switch 1516 is illustrated in FIG. 18A. The illustrated representation includes a common lens system 1802 for the first and second fibers 1808 and 1820. Focusing mirror 220 is represented as a lens 1804. Light passing between the first fiber 1808 and the switch 1516 is represented with solid lines, while light passing between the switch 1516 and the second fiber 1820 is represented by dashed lines. The transmission gratings are omitted from this representation since they have no focusing effect and are located where the beams are collimated.

Input light 1806 is directed to the first lens 1802 from the input fiber 1808. The input light 1806 is collimated as beam 1810, and is directed to the second lens 1804. The second lens 1804 focuses the collimated beam 1810 to the switch 1516 as focused beam 1812. When the switch 1516 is in the second position, the switch 1516 redirects the focused beam 1812 as redirected beam 1814. The redirected beam 1814 is collimated by the second lens 1804, as collimated beam 1816. The collimated beam 1816 is then focused by the first lens 1802 as focused beam 1818. The focused beam 1818 is directed to the second fiber 1820.

For comparison, FIG. 18B illustrates a schematic representation of the unfolded optical path through the OADM device using the switch 1116. In this case, the switch is located at the focus of beam 1812. The input light is collimated by collimating/focusing system 1850 and the light exiting to second fiber 1820 is focused by collimating/focusing system 1852.

The use of an aspherical focusing optic 220 permits the different optical channels to be focused at the light dispersed region 224 with uniform interchannel spacing. This is useful, for example, where the device 200 is used as a MUX/DMUX, in which case the fiber array 230 may be a standard optical fiber array where the fiber cores are equidistantly spaced apart from each other. It is also useful where the device is used as a channel monitor. The detector unit 604 may be a photodetector sensor array, with a linear array of pixels having uniform width. For example, the center-to-center pixel spacing may be 50 μm. Where each channel is assigned two pixels and the interchannel spacing is 50 GHz (0.4 nm), then the dispersion at the focal plane in the light dispersed region 224 is 500 GHz mm$^{-1}$. Where a microlens array is positioned before the fiber array 230, the detector unit 604, or switches 806, the center-to-center spacing of the lenses in the lens array may be uniform when the aspherical focusing optic 220 is used.

Figure 19:
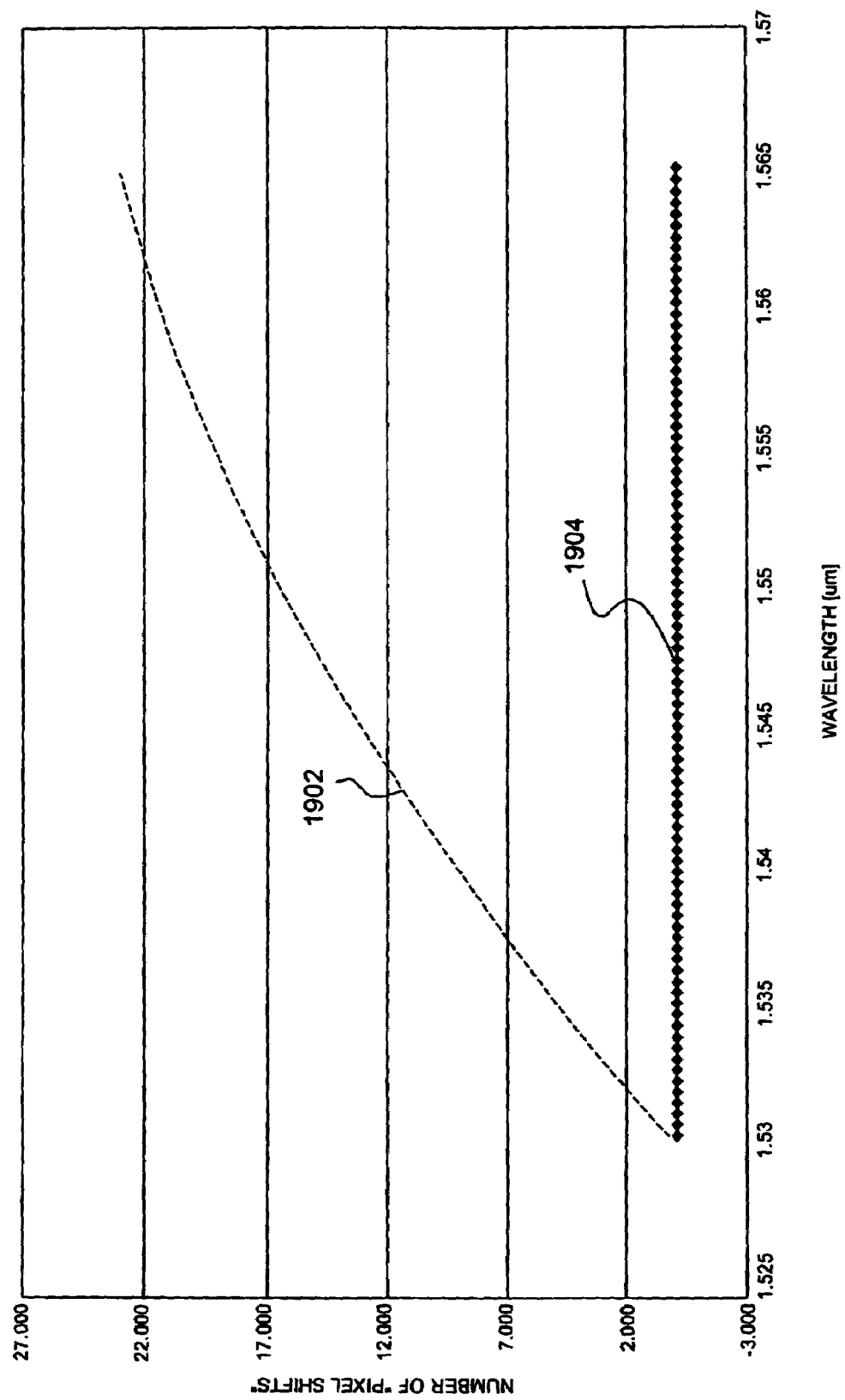
FIG. 19 shows a plot comparing dispersions in the light dispersed region using spherical and aspherical focusing components.

If the dispersion at the light dispersed region 224 is not uniform, then some channels may take more than two pixels. A plot is shown in FIG. 19 that compares the uniformity of the dispersion at the light dispersed region 224 using spherical optics and aspherical optics. The calculations used to generate FIG. 19 assumed that the device 200 was analyzing light in the range 1530 nm–1565 nm and that the channel separation was 50 GHz (0.4 nm), resulting in 88 channels. Each channel was assigned two pixels, thus ideally the channels are separated in the light dispersed region by 100 μm, corresponding to using transmission gratings 214 and 216 having a period of 1042 nm. In the figure, the y-axis shows the number of times that a channel has shifted more than 50 μm relative to its ideal position as a function of wavelength. The first curve 1902 represents the results when spherical optics are assumed, and curve 1904 shows the results when aspherical optics are assumed. The spherical case shows that the dispersion is quite non-uniform across the light dispersed region 224, whereas the dispersion is very uniform when aspherical optics are used.

Figure 20:
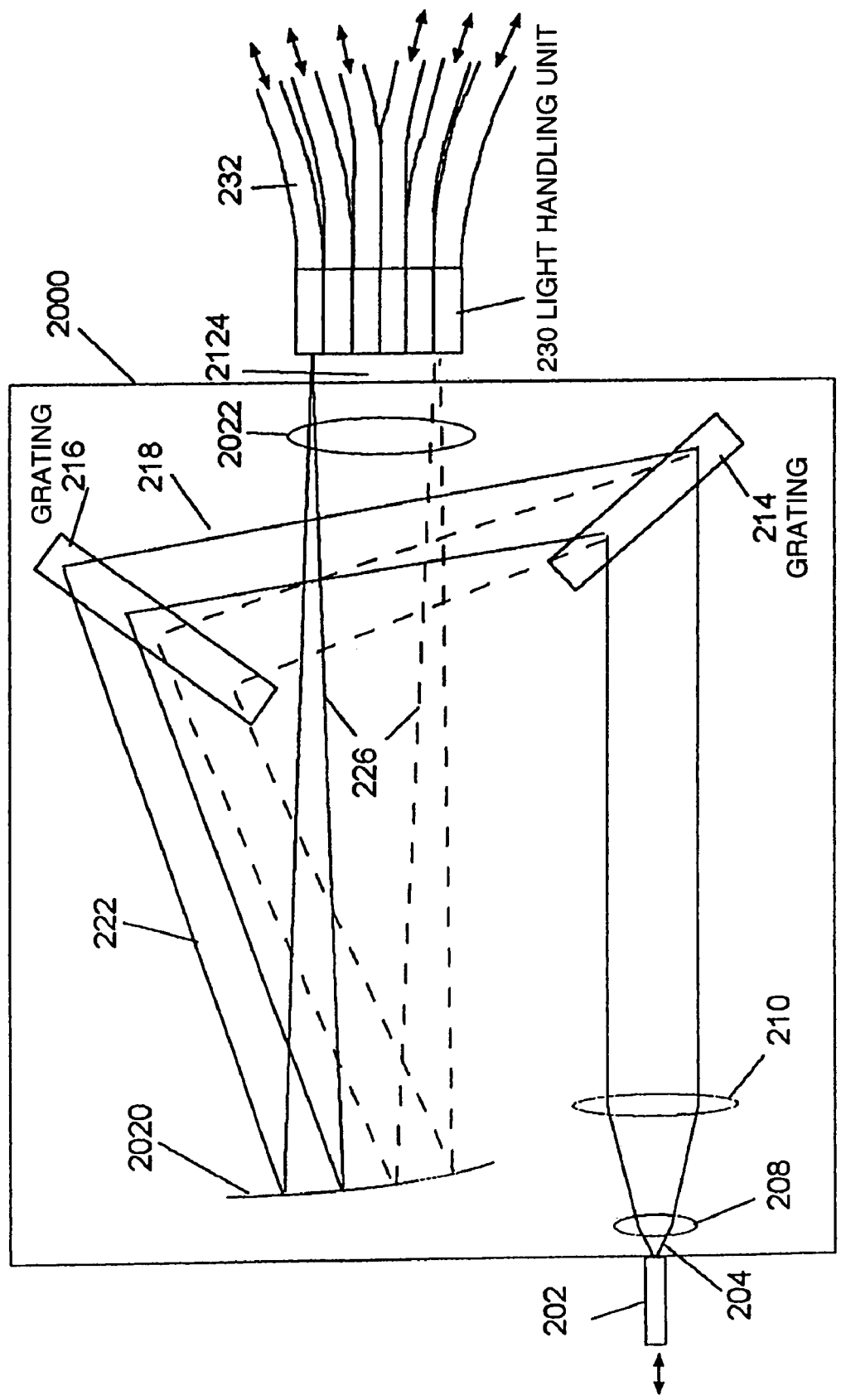
FIG. 20 illustrates an embodiment of the invention using aspherical focusing components.

The particular optics assumed to produce the modeled results shown for curve 1904 are shown in FIG. 20. The aspherical mirror 2020 had an aspheric surface whose sag, $z_m$, is given as a function of r, the radial co-ordinate on the mirror, as:

$$z_m(r) = \frac{cr^2}{1 + \sqrt{1 - (1+k)c^2 r^2}} + a2r^2 + a4r^4 + a6r^6 \ldots + a16r^{16} \quad (2)$$

where, k is the selected conical constant, c is the selected curvature and a2–a16 are the aspherical constants. The values of the various constants used in the model for the aspheric mirror are listed in Table I.

TABLE I

Values for Constants in Model for Aspheric Mirror

| constant | value |
|---|---|
| k | −0.9331551 |
| c | 7.4608158 × 10$^{-3}$ mm$^{-1}$ |
| a2 | 7.3167596 × 10$^{-4}$ mm$^{-1}$ |
| a4 | 1.757052 × 10$^{-6}$ mm$^{-3}$ |
| a6 | −1.7351298 × 10$^{-8}$ mm$^{-5}$ |
| a8 | 1.34355037 × 10$^{-10}$ mm$^{-7}$ |
| a10 | −6.0319772 × 10$^{-13}$ mm$^{-9}$ |
| a12 | 1.5372169 × 10$^{-15}$ mm$^{-11}$ |
| a14 | −2.10916 × 10$^{-18}$ mm$^{-13}$ |
| a16 | 1.21165631 × 10$^{-21}$ mm$^{-15}$ |

An aspherical compensator 2022 may also be used to flatten the field at the light dispersed region 224. The aspherical compensator has an aspherical surface whose sag, $z_c$, is given by:

$$z_c(r) = \frac{cr^2}{1 + \sqrt{1 - (1+k)c^2 r^2}} + b1r + b2r^2 + b3r^3 \ldots + b8r^8 \quad (3)$$

where b1–b8 are the selected aspherical constants. The values of the various constants used in the model for the aspheric compensator are listed in Table II.

TABLE II

Values for Constants in Model for Aspheric Compensator

| constant | value |
| --- | --- |
| k | −175.6974 |
| c | $15.9511359 \times 10^{-3}$ mm$^{-1}$ |
| b1 | $3.366450 \times 10^{-5}$ |
| b2 | $1.4243661 \times 10^{-2}$ mm$^{-1}$ |
| b3 | $-6.4890499 \times 10^{-5}$ mm$^{-2}$ |
| b4 | $-5.1346641 \times 10^{-5}$ mm$^{-3}$ |
| b5 | $-5.3936903 \times 10^{-6}$ mm$^{-4}$ |
| b6 | $-4.2646931 \times 10^{-7}$ mm$^{-5}$ |
| b7 | $-3.4720059 \times 10^{-9}$ mm$^{-6}$ |
| b8 | $9.172209 \times 10^{-9}$ mm$^{-7}$ |

It will be appreciated that an aspheric mirror may used alone, without an aspheric compensator.

Figure 21:
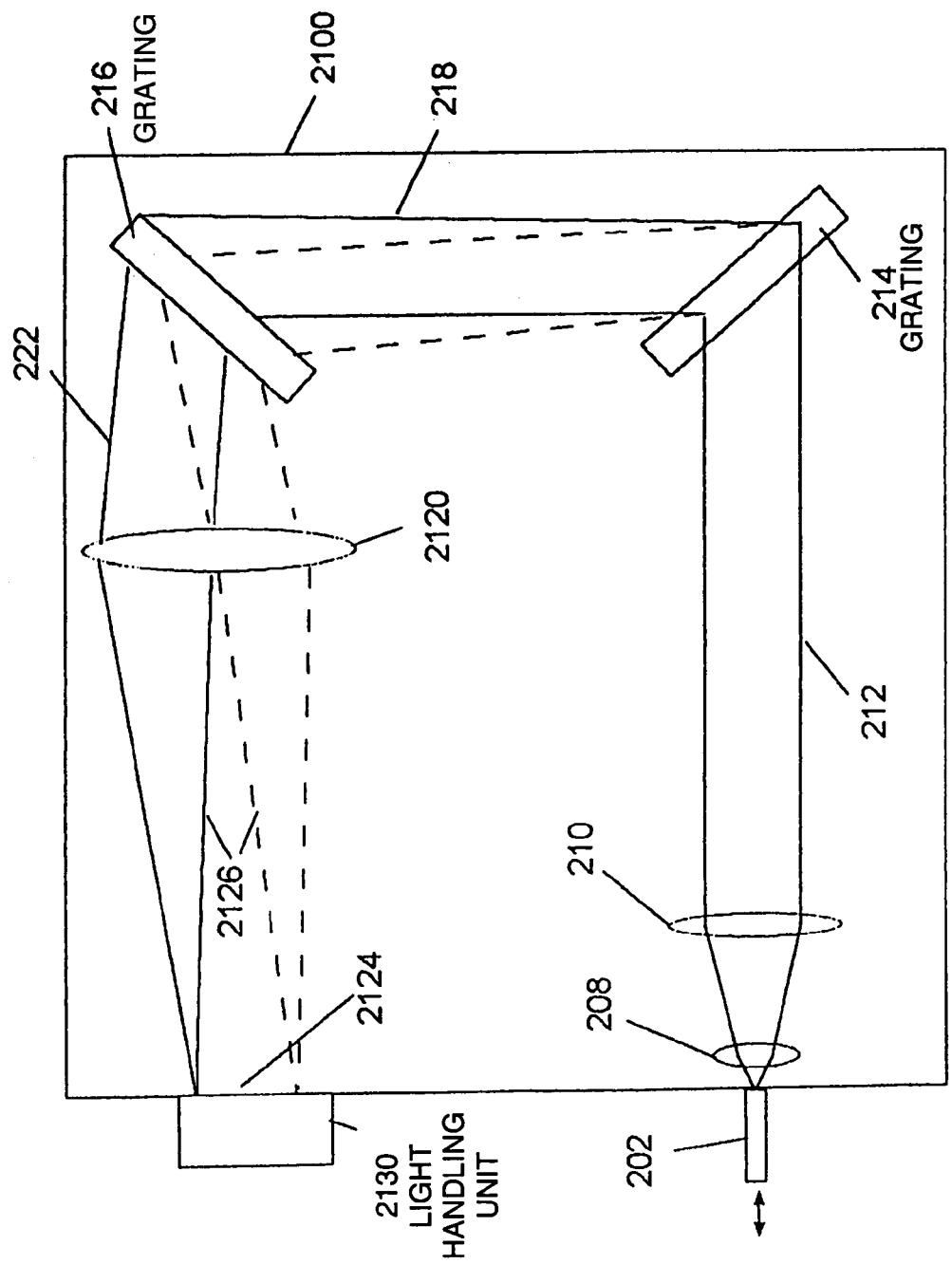
FIG. 21 schematically illustrates a double transmission grating device according to the present invention that uses a transmissive focusing system for focusing light from the transmission gratings to the light dispersion region.

Furthermore, a transmissive focusing element, rather than a reflective focusing element, may be used to focus the light from the second grating 216 to the light dispersed region 224. Such a configuration is illustrated in FIG. 21. The illustrated device 2100 has a transmissive focusing element 2120 that focuses the doubly diffracted beam 222 to the light dispersed region 2124. The transmissive focusing element 2120 may be, for example, a lens or a diffractive focusing optic. The transmissive focusing element 2120 may have either a spherical or an aspherical optical transfer function, to provide spherical or aspherical focusing respectively. The focused light components 2126 are directed to a light handling unit 2130 which may be any device disposed at the light dispersed region 2124 for handling the dispersed light components 2126, such as a fiber array, a switch array, a detector array, or the like.

It will further be appreciated that if the focusing elements, either mirror or lens system, or a combination, do not produce uniform dispersion at the light dispersed region 2124, then a fiber array or detector array positioned at the light dispersed region 2124 may itself be non-uniform, having a non-uniformity matching that of the dispersion. Therefore, for example, if the separation between different channels changes from the short wavelength to the long wavelength, then the center-to-center spacing of detector elements in a detector array may increase in a similar manner. Having a non-uniform detector array preserves a constant number of detector elements per channel spacing, even though the different channels are not dispersed linearly across the light dispersed region 2124. Also, if the light handling device 2130 is a fiber array or a switch array, then the fibers or switches may be arrayed to have non-uniform separation to match the dispersion of the light in the light dispersed region 2124.

Figure 34:
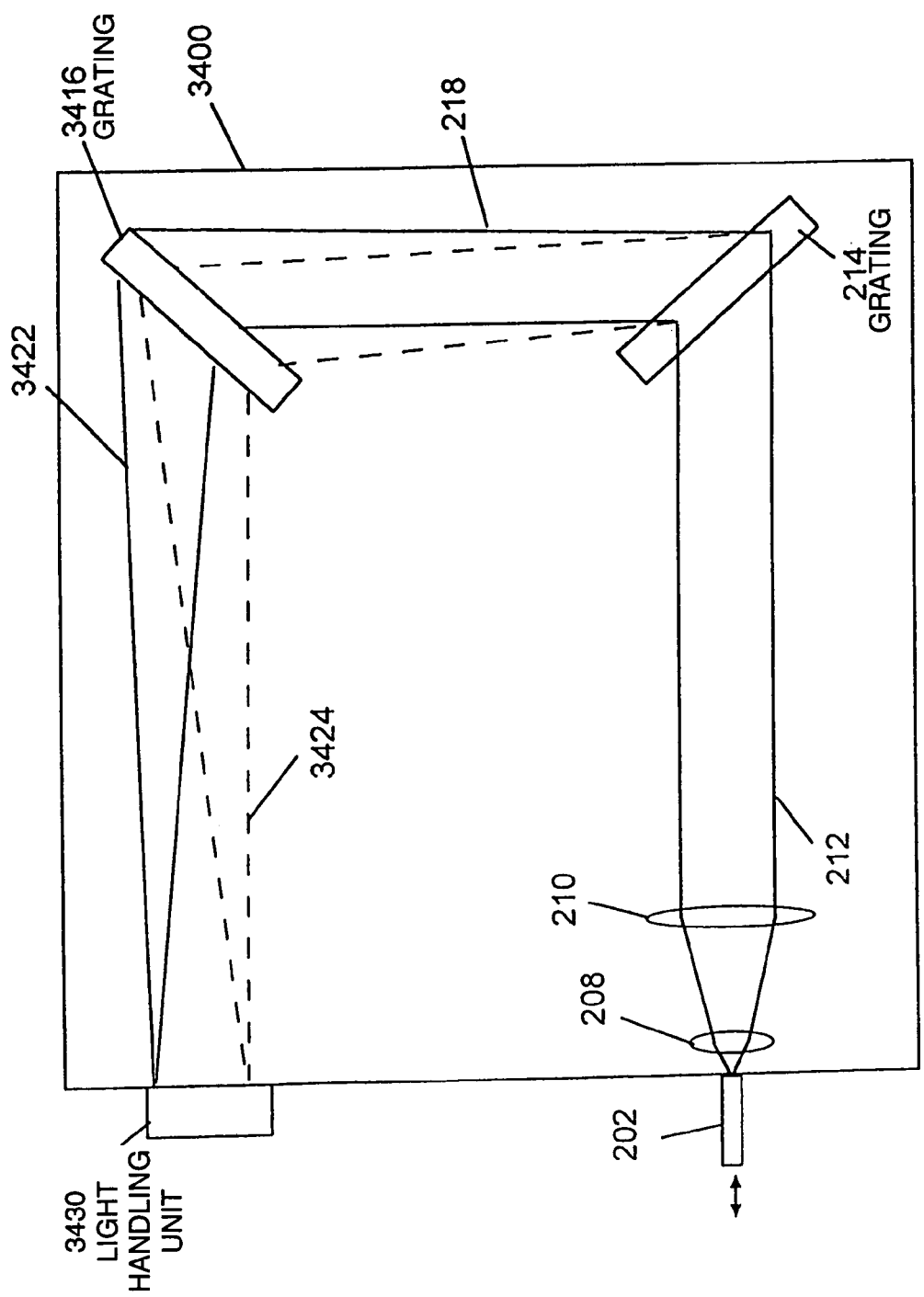
FIG. 34 schematically illustrates an embodiment of the present invention that uses a diffractive optical element for focusing light as well as dispersing light.

Another embodiment 3400 in which a transmissive focusing element is used to focus the light to the light handling unit 3430 is illustrated in FIG. 34. In this embodiment, the second transmission grating 3416 is a diffractive element that focuses as well as disperses the light. Therefore, diffracted beams 218 are focused from the transmission grating 3416 to the light handling unit 3430, illustrated as beam 3422 and beam 3424. It will be appreciated that more than one of the gratings may both focus and disperse light. For example, the lenses 208 and 210 and transmission grating 214 may be replaced by a grating that collimates and disperses light directly from the fiber 202.

Figure 22:
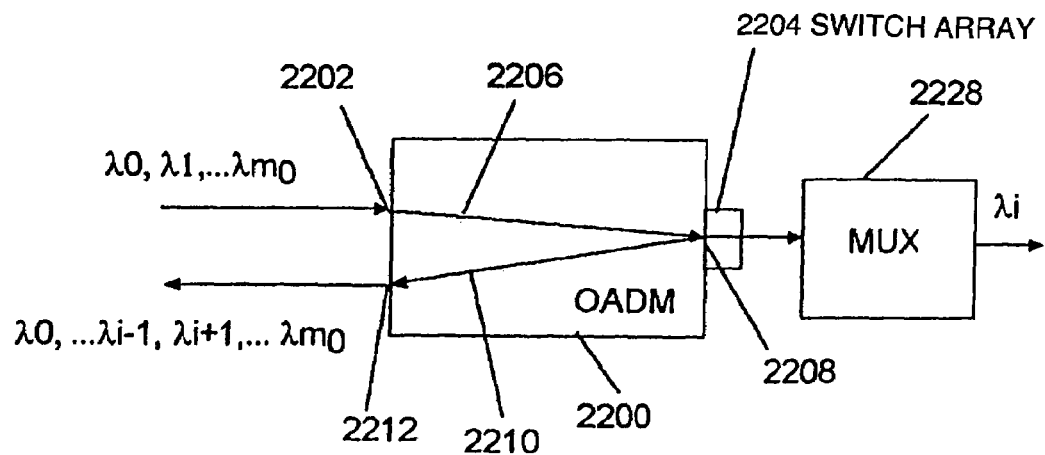
FIG. 22 schematically illustrates an embodiment of a transmission grating device that has two output ports, according to the present invention.

Another embodiment of a transmission grating add/drop device 2200 is illustrated in FIG. 22. In this device 2200, there are three ports for light to either enter or exit. The first port 2202 is an input port for inputting light to the device 2200. Light reaches the switch array 2204 from the first port 2202 along a first path 2206 after the different channels are separated by being dispersed by the transmission gratings. The switch array 2204 is disposed so that each separated channel has a respective optical switch that selectively reflects or transmits the light of its associated channel. Light transmitted by the switch array is directed through the second port 2208. The light transmitted through the second port 2208 may be combined in a MUX 2228 into a single combined signal.

Light reflected by the switch array 2204 is directed along a second path 2210 that passes through the transmission gratings. Those channels whose light is reflected by the switch array 2204 are recombined into a single output signal appearing at the third port 2212. In the illustration, channels having wavelengths $\lambda 0-\lambda m_0$ are directed into the device 2200 through the first port 2202. The switch array 2204 selects the channel having a wavelength $\lambda i$ for transmission through the second port 2208, while all other channels are reflected for output from the third port 2212. Thus, unlike the embodiment illustrated in FIG. 10, this embodiment does not require the use of a circulator to separate the input from the reflected output. It will be appreciated that the switch array 2204 may select any combination of one or more channels for transmission.

Although internal details of this embodiment are not expressly included in the figure, it will be appreciated that any of the add/drop multiplexer configurations described herein may be adapted to produce a three port add/drop device.

Figure 31:
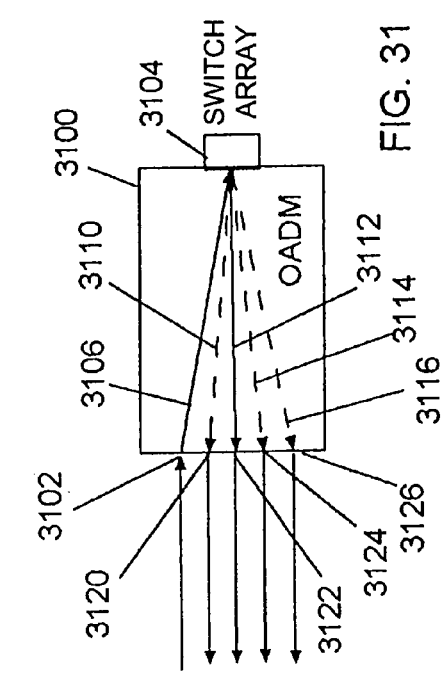
FIG. 31 schematically illustrates an embodiment of a device according to the present invention having multiple input and output ports.

Another embodiment of a transmission grating add/drop device 3100 is illustrated in FIG. 31. In this device 3100, there are several ports for light to enter or exit. The first port 3102 is an input port for inputting light to the device 3100. Light reaches the switch array 3104 from the first port 3102 along a first path 3106 (solid line) after the different channels are separated by being dispersed by the transmission gratings. The switch array 3104 is disposed so that each separated channel has a respective optical switch 3108 that selectively reflects the light of its associated channel into one of a number of different directions.

Figure 32:
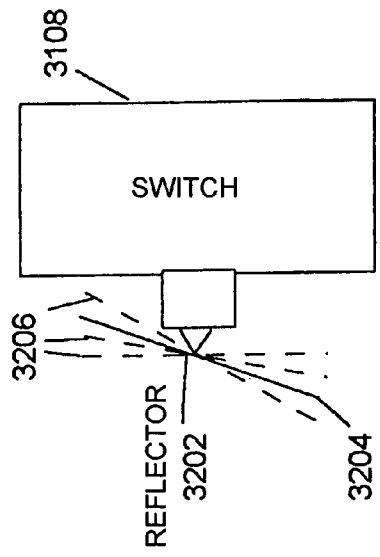
FIG. 32 illustrates a multiple position optical switch for use with the embodiment of device illustrated in FIG. 31.

An embodiment of a switch having multiple states is illustrated in FIG. 32. The switch 3108 has a reflector 3202 that is selectively movable among several different positions. In the particular embodiment illustrated, the reflector 3202 is pivotable among four different positions: one position is illustrated as a solid line, and the other positions 3206 are illustrated with dashed lines. It will be appreciated that the switch may be selectively adjustable between a number of positions that is different from four.

The light reflected by the switch array 3104 is directed back through the transmission gratings. The switches 3108 are selectively operable between a number of positions, four in the illustrated embodiment, that correspond to different paths 3110, 3112, 3114 and 3116 coupled to respective selected channel ports 3120, 3122, 3124 and 3126. Thus, each channel may be independently switchable to a number of different output ports through selective positioning of the respective switches 3108. In the illustration, the switch 3108 is in a position to direct light along path 3112, shown in solid line, to port 3122. The other possible paths 3110, 3114 and 3116 are shown in dashed line.

Figure 33:
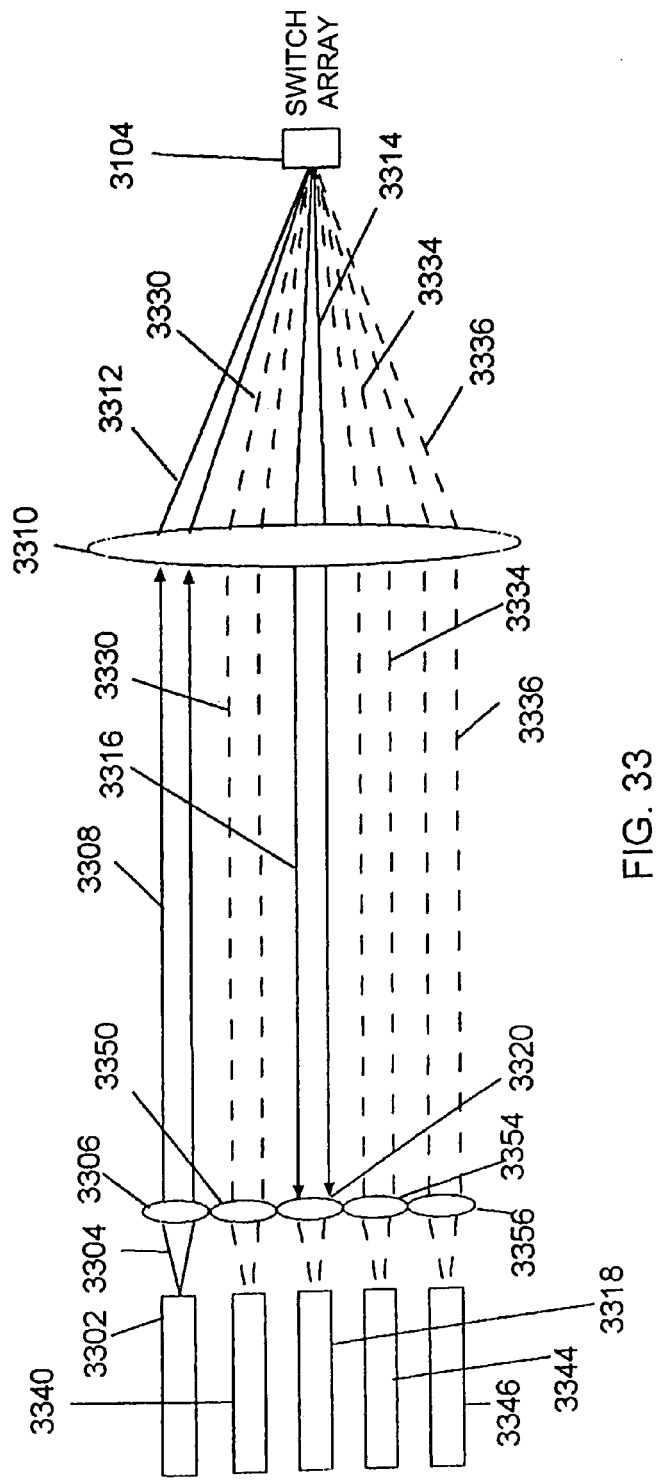
FIG. 33 schematically illustrates equivalent optical paths through the device illustrated in FIG. 31.

An unfolded, equivalent optical architecture for the device 3100 is illustrated in FIG. 33. Light 3304 enters the device 3100 through a first fiber 3302 and is collimated in a first collimating unit 3306. The collimated beam 3308 passes through the transmission gratings (not shown) to the focusing optic 3310, which directs the focused beam 3312 to the switch array 3104. The switch array 3104 directs each channel along a particular selected reflected path. Only one channel is illustrated in the figure. The channel is reflected along path 3112, that corresponds to the path traveled by the diverging beam 3314, collimated by the focusing optic 3310 to produce collimated beam 3316, and collimated beam 3316 which is focused into fiber 3318 by focusing system 3320.

The switch 3108 is selectable among other paths, 3110, 3114 and 3116 that correspond to light beams 3330, 3334 and 3336, illustrated in dashed lines, that are directed to respective fibers 3340, 3344 and 3346 by respective focusing systems 3350, 3354 and 3356. Thus, the device 3100 permits selective switching of different channels into different outputs, and may be regarded as being a multiple output drop filter.

It will be appreciated that light may be directed into the device 3100 in the reverse direction, so that light entering the device 3100 from ports 3120, 3122, 3124 and 3126 is combined into an output signal that exits the device from port 3102. In such a case, the device 3100 operates as a multiple input add filter. Furthermore, light input to the device from ports 3120, 3122, 3124 and 3126 need not be directed to port 3102 but, so long as the switches 3108 provide suitable selectivity, may be directed to any of the other ports.

Figure 23:
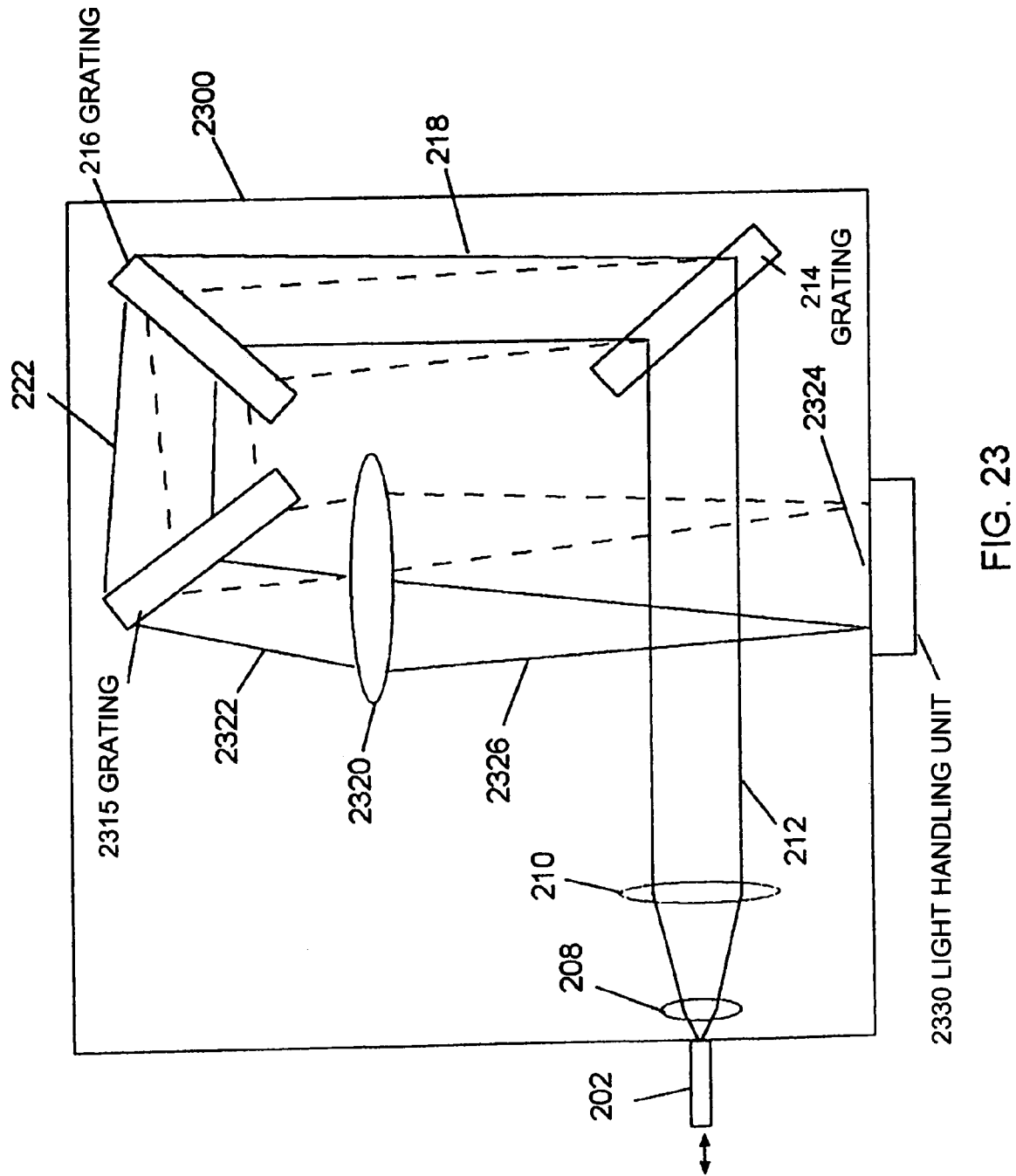
FIG. 23 schematically illustrates a double transmission grating device that has three transmission gratings, according to the present invention.

The invention is not restricted to using only two diffraction gratings, and other numbers of gratings may be used. Another embodiment of a transmission grating WDM device 2300 is illustrated in FIG. 23, which uses three gratings. An advantage of using additional gratings is that, where the grating period is constant, the dispersion is increased and so effective channel separation may be achieved in a smaller device.

Following diffraction off the first two gratings 214 and 216, the doubly-dispersed light 222 is directed to a third grating 2315 that diffracts the light, as triply diffracted light 2322, towards a light focusing element 2320, illustrated in this case as a lens. It will be appreciated that the light focusing element 2320 my also be any other suitable type of focusing element. Individually focused wavelength components 2326 are directed to the light dispersed region 2324 where they are spatially separated from each other. The focused light components 2326 are directed to a light handling unit 2330 which may be any device disposed at the light dispersed region 2324 for handling the dispersed light components 2326, such as a fiber array, a switch array, a detector array, or the like. It will be appreciated that other numbers of transmission gratings may be used, other than two or three.

Some diffraction gratings display higher diffraction efficiency for TE polarized light than for TM polarized light, and so the total diffraction efficiency may be reduced if randomly polarized light is transmitted into the device. Therefore, it is advantageous to use polarization dependent components within the device in order to increase the total diffraction efficiency. One embodiment of such a device 2400, schematically illustrated in FIG. 24, includes a polarization separator 2410, which may include a polarizing beamsplitter or other suitable component for separating randomly polarized light into its orthogonal polarization states.

Light 2402 from the fiber 202 is randomly polarized, and is collimated in the focusing/collimating system 206. The collimated light enters the polarization separator 2410, which in the illustrated embodiment includes a polarization beamsplitter 2412 and a turning prism 2414. A first polarization component 2416 is transmitted through the polarization beamsplitter 2412 along a first path 2420 (illustrated with solid lines). A second polarization component 2418, having a polarization state orthogonal to the polarization state of the first polarization component, is reflected from the polarization beamsplitter 2412 to the turning prism 2414. The turning prism 2414 reflects the second polarization component 2418 along a second path 2422 (illustrated with dashed lines) approximately parallel to the first path 2420. A polarization rotator 2424, such as a half-wave retardation plate, is disposed on one of the paths 2420 and 2422 to rotate the polarization of that path through approximately 90°, so that the polarization of the light propagating along both paths 2420 and 2422 is parallel, and oriented in the preferred polarization state for maximum diffraction efficiency in the transmission gratings 214 and 216.

Figure 24:
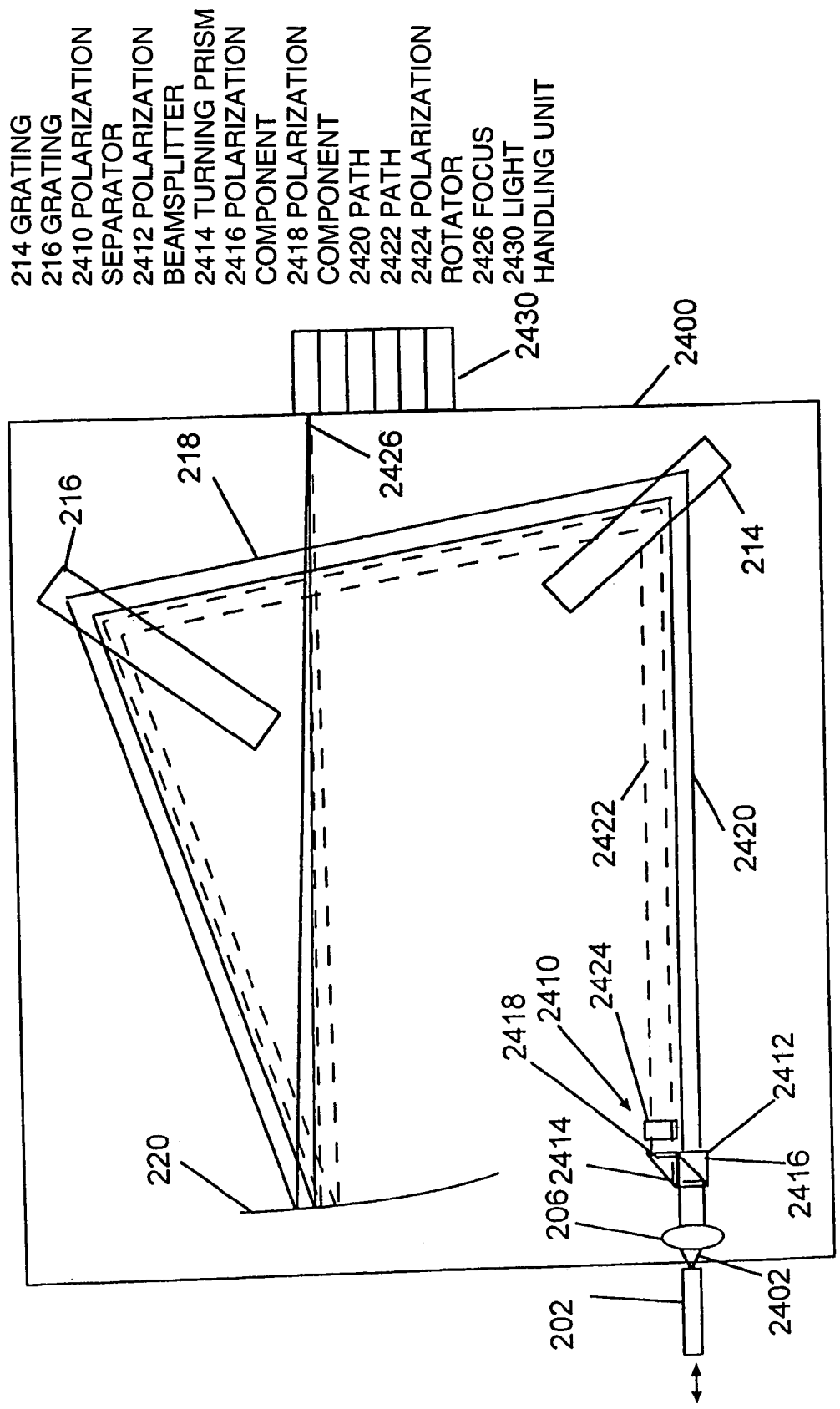
FIG. 24 schematically illustrates an embodiment of a double transmission grating device that includes a polarization separator according to the present invention.

In the embodiment illustrated in FIG. 24, it has been assumed that only one wavelength of light enters the device 2400, for the sake of clarity. The light propagating along the first and second paths 2420 and 2422 propagates approximately parallel through the first and second gratings 214 and 216 until reaching the focusing mirror 220. The focusing mirror 220 focuses the light in the two paths 2420 and 2422 to the same focus 2426 at the light handling unit 2430. This embodiment is particularly useful when the light handling unit 2430 includes photodetectors to detect the power of the light in the different channels.

Figure 28:
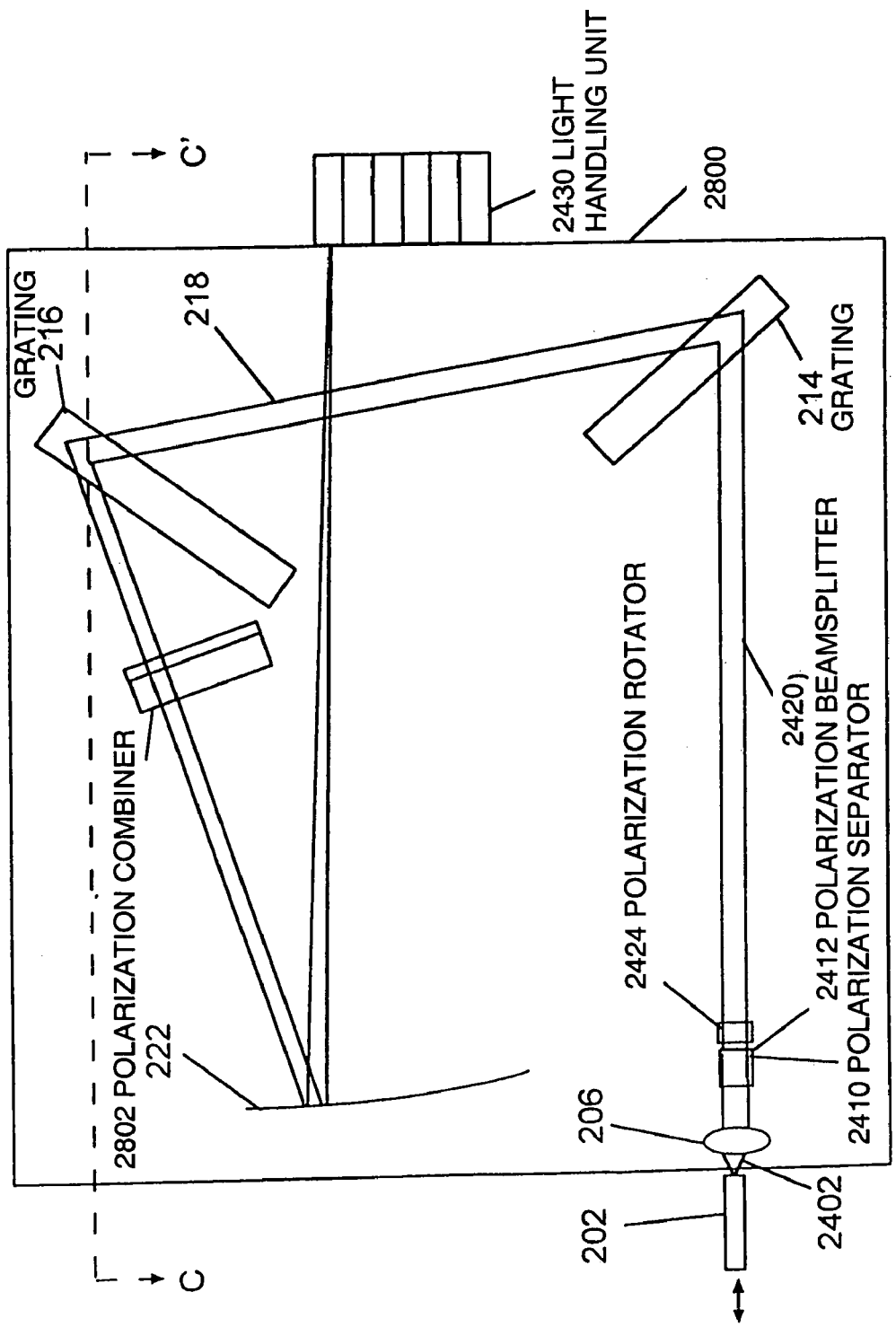
FIG. 28 schematically illustrates another embodiment of a double transmission grating device that includes a polarization separator according to the present invention.

Another embodiment of the device 2800 that considers that polarization of the light is schematically illustrated in FIG. 28. The device 2800 includes a polarization separator 2410 similar to that illustrated in FIG. 24. In FIG. 24, the polarization states are separated in a direction that is in the diffraction plane, in other words parallel to the plane defined by the directions of diffraction of gratings 214 and 216. In the embodiment 2800 illustrated in FIG. 28, the direction of separation is perpendicular to the plane of diffraction. Thus, light entering through fiber 202 is separated into two beams of orthogonal polarization that are spaced out of the plane of the figure. A polarization rotator 2424 rotates the polarization of one of the beams to an orientation that results in high diffraction efficiency in the gratings 214 and 216.

Figure 29:
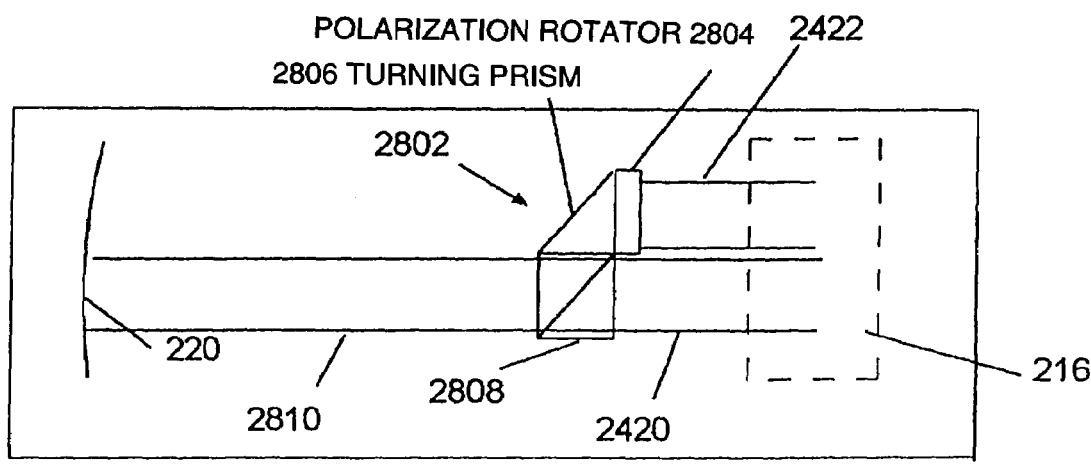
FIG. 29 schematically illustrates cross-section CC' of the device illustrated in FIG. 28.

After diffraction by the gratings 214 and 216, the beams 2420 and 2422 are combined in a polarization combiner 2802 before incidence on the mirror, as is schematically illustrated in FIG. 29. The polarization combiner 2802 includes a polarization rotator 2804 to rotate the polarization of one of the beams 2420 and 2422 through 90°. Beam 2422 is directed by a turning prism 2806 into a polarization beamsplitter 2808, which combines the two beams 2420 and 2422 into a randomly polarized beam 2810, which then passes to the mirror 220. This embodiment is particularly useful when the device 2800 operates as a MUX, DMUX, or add/drop multiplexer.

It will be appreciated that different types of polarization separator 2410 and polarization combiner 2802 may be employed, in addition to those illustrated in the drawings. Furthermore, it will be appreciated that the polarization separator 2410 and polarization combiner 2802 perform the reverse optical operation when light passes through the device 2800 in reverse. Thus, light passing from the light handling device 2430 to the multiple channel fiber 202 is polarization separated in the polarization combiner 2802 and is polarization combined in the polarization separator 2410.

Another approach to ensure high diffraction efficiency when the device is used with randomly polarized light is to use gratings that provide high diffraction efficiency for both the incident TE and TM polarizations. For example, it is possible to design a transmission grating so that the diffraction efficiency of both polarizations is substantially equal, as is discussed in U.S. patent application Ser. No. 09/789,888.

Figure 30:
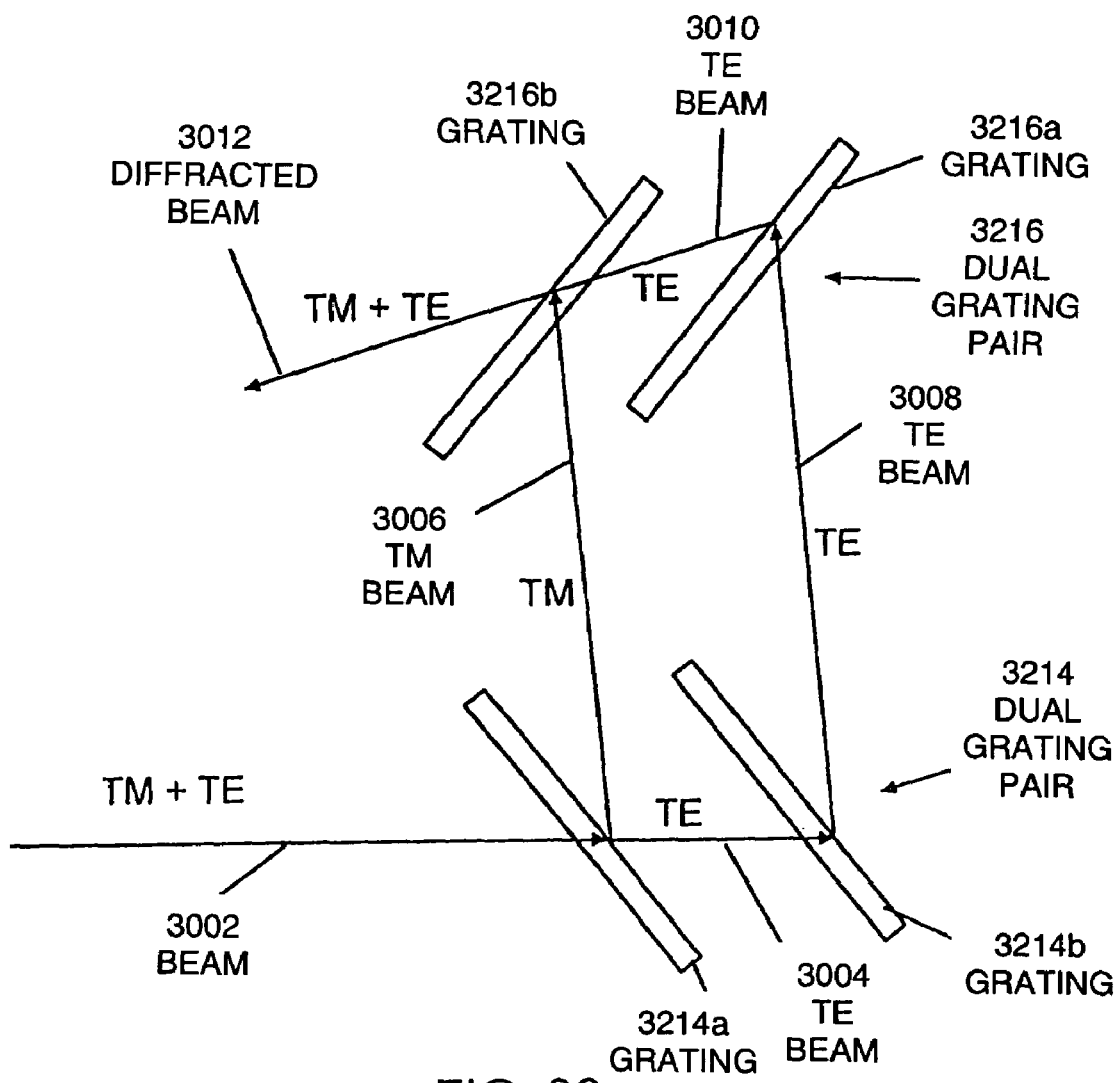
FIG. 30 schematically illustrates an embodiment of dual transmission diffraction gratings that provide high diffraction efficiency to randomly polarized light.

In another approach, the gratings 214 and 216 may be replaced by dual grating pairs 3214 and 3216, where each member of the pair is optimized for high diffraction efficiency for a single polarization, as is schematically illustrated in FIG. 30. A beam 3002 of mixed polarization, having both TE and TM components, or of random polarization, is incident on a first grating 3214a of the first dual grating pair 3214, which is optimized for high diffraction efficiency for TM light, and zero diffraction efficiency for TE light. Thus, the TE light passes through the grating 3214a as beam 3004 while the TM light is diffracted as beam 3006. The TE beam 3004 is then diffracted by the second grating 3214b of the dual grating pair 3214 which is optimized for high diffraction efficiency of TE light, as beam 3008.

The TE beam 3008 is then diffracted by the first grating 3216a of the second dual grating pair 3216 as beam 3010. The grating 3216a is optimized for high diffraction efficiency for TE light. The TE beam 3010 passes through the second grating 3216b of the second dual grating pair 3216, which is optimized for high diffraction efficiency for TM light and zero diffraction for TE light. The TM beam 3006 is diffracted by the second grating 3216b. Careful alignment of the gratings 3214a, 3214b, 3216a and 3216b results in the TE beam 3101 being combined with the TE beam 3006 to produce a diffracted beam 3012 of mixed polarization.

It will be appreciated that dual grating approach may be used in any of the embodiments described above. Furthermore, the dual grating approach may be used in devices having more than two dual grating pairs.

Figures 25A, 25B:
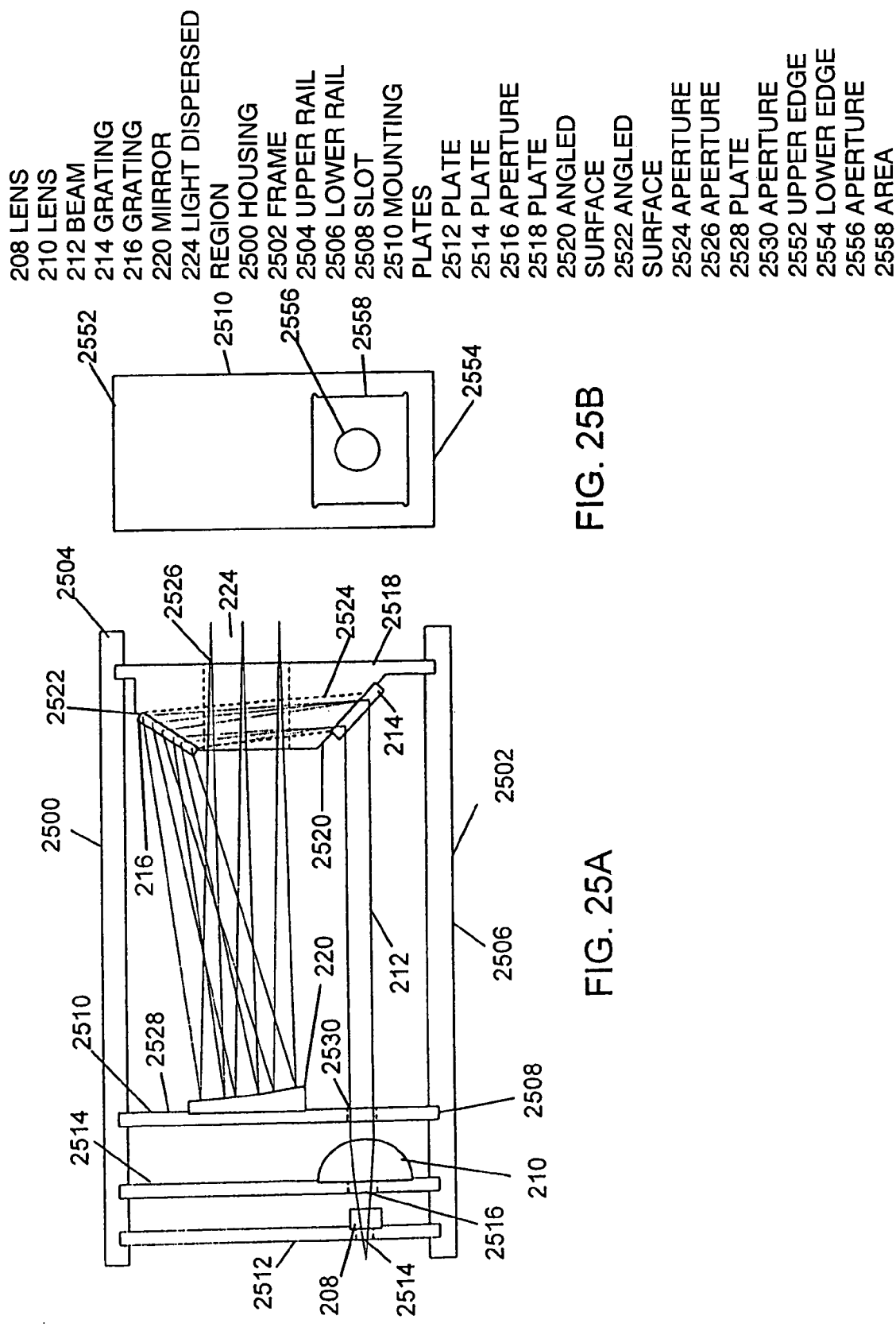
FIGS. 25A and 25B schematically illustrate an embodiment of a mechanical frame for assembling a double transmission grating device according to the present invention.

An embodiment of a housing for mounting the different components of a double transmission diffraction grating device is illustrated in FIGS. 25A and 25B. The housing 2500 includes a frame 2502 having upper and lower rails 2504 and 2506 with slots 2508 running thereacross. The upper rail 2504 and lower rail 2506 are provided with complementary slots forming slot pairs, where each slot pair is aligned to receive a mounting plate 2510. The various optical components of the device are mounted on different mounting plates 2510 that fit into the slots 2508. Precise positioning of the slots along the rails and of the optical components on the plates permits the device to be assembled with components in alignment, without the need for optical alignment of the optical components after assembly. The ability to assemble the optical system without aligning the optical components after assembly is termed passive alignment. The frame and slots may be machined, for example, from aluminum, stainless steel, or any other suitable material.

Optical components are mounted on the plates 2510, for example using epoxy adhesive. In the particular embodiment illustrated, the first lens 208 is mounted on a first plate 2512. The first plate 2512 is provided with an aperture 2514 over which the lens 208 is mounted, so as to permit the light to enter the device 2500. The second lens 210 is mounted on a second plate 2514, also provided with an aperture 2516. In general, transmissive optical components are mounted over apertures in the plates to permit light to pass therethrough.

The transmission diffraction gratings 214 and 216 are positioned on a plate 2518 that has angled surfaces 2520 and 2522 upon which the respective gratings 214 and 216 are mounted. An aperture 2524 permits light to pass between the gratings 214 and 216. Another aperture 2526 permits the passage of light from the mirror 220 to the light dispersed region 224.

The mirror 220 is mounted on another plate 2528. The plate 2528 includes an aperture 2530 to permit passage of the beam 212 from the second lens 210. In general, plates carrying both transmissive and reflective optical components may be provided with apertures to permit passage of light through a part of the plate where the optical component is not mounted. An advantage of this construction is that the plates block stray light from propagating within the device, which is particularly advantageous when the device is used as a monitor and low light levels are being detected.

A plate 2510 is illustrated in FIG. 25B. The plate has parallel upper and lower edges 2552 and 2554. The plate 2510 is provided with an aperture 2556 in an area 2558 that may be countersunk by machining or etching to receive an optical component.

It will be appreciated that, rather than sliding the plates into slots along upper and lower edges, the frame may have slotted members on the sides, and the sides of the plates fit into the slots on the slotted members.

It will also be appreciated that the position of the slots 2508 along the frame 2502 is dependent on the optical properties of the system and the particular component carried by the particular plate to be placed within the slots. The position may be determined theoretically, experimentally, or both. The accurate positioning of the slots 2508 and the accuracy of replication of the determined slot positions influences the ability to passively align the optical components. In addition, it may be important that the frames fit snugly into their respective slots to reduce or minimize the amount of variability in the position of the optical components.

Figure 26:
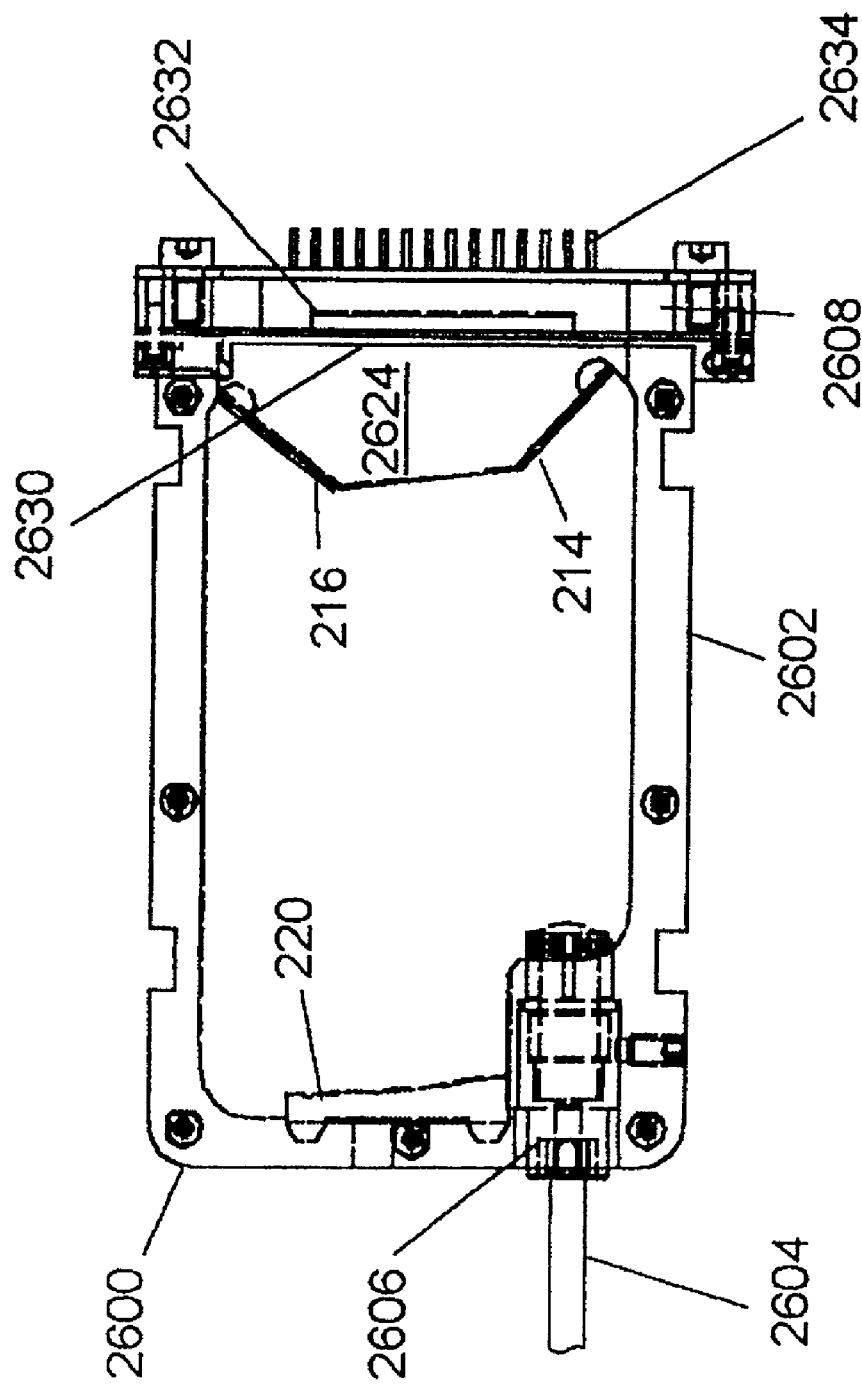
FIGS. 26 and 27 schematically illustrate another embodiment of a mechanical frame for assembling a double transmission grating device according to the present invention.

Another embodiment of a housing 2600 for mounting the different components of a double transmission diffraction grating device is illustrated in FIG. 26. An integral frame 2602 holds the gratings 214 and 216, and the focusing mirror 220. The integral frame 2602 may be machined from metal, such as aluminum or stainless steel, or may be precision injection molded using a plastic material. The input fiber 2604 is coupled to a collimation unit 2606, which includes one or more lenses to collimate the light from the fiber 2604. The collimation unit 2606 is positioned in the integral frame 2602 to direct collimated light to the first transmissive diffraction grating 214. The integral frame 2602 is fabricated to be free of obstructions along the optical path between the collimation unit 2606 and the light handling unit 2630. The collimation unit 2606 may be provided with a polarization separator in a manner similar to that illustrated in FIG. 24.

The light handling unit 2630 may be disposed on a plate 2608 attached to the integral frame 2602 via screws or other suitable method. Independent attachment of the plate 2608 provides a degree of adjustability in the alignment of the light handling unit 2630 relative to the separated channels incident at the light dispersed region 2624. The light handling unit 2630 may be any device that operates on the separated channels incident at the light dispersed region 2624, such as a detector array (illustrated), a fiber array or a light switch array.

In this embodiment, and in the other monitor embodiments described above, the detector array 2632 may be a uniform photodetector array or may be an array with varying spacing between the individual detectors.

Figure 27:
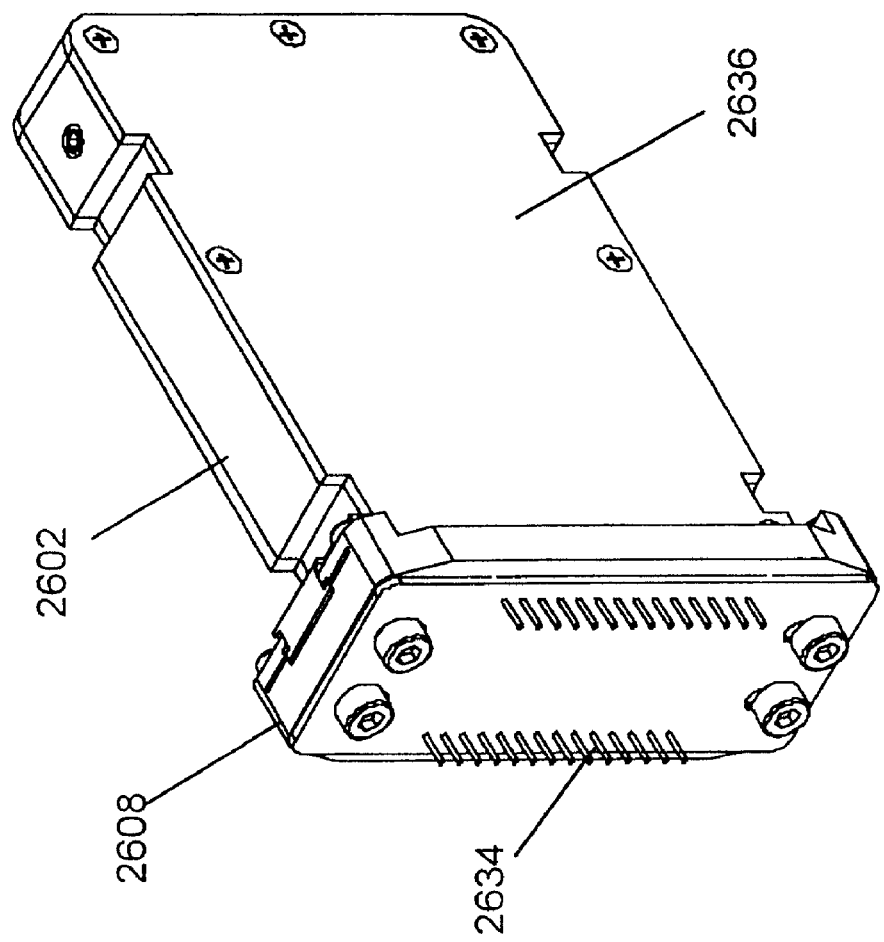

A perspective view of the device 2600 is illustrated in FIG. 27, showing the external features of the integral frame 2602. The plate 2608 has a number of output pins 2634 that permit connection of the detector electronics to an external device, such as a monitor or processor. The sides of the integral frame 2602 are covered with side covers 2636, at least one of which is detachable for access for mounting components within the integral frame 2602. One of the covers 2636, on the other hand, may be formed integral to the integral frame 2602.

Figure 35A:
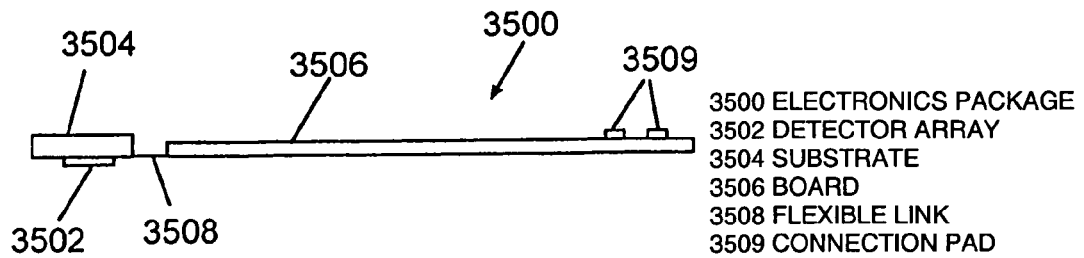
FIGS. 35A–35C schematically illustrate approaches to mounting an electronic circuit in the embodiment illustrated in FIGS. 26 and 27 according to the present invention.
Figure 35B:
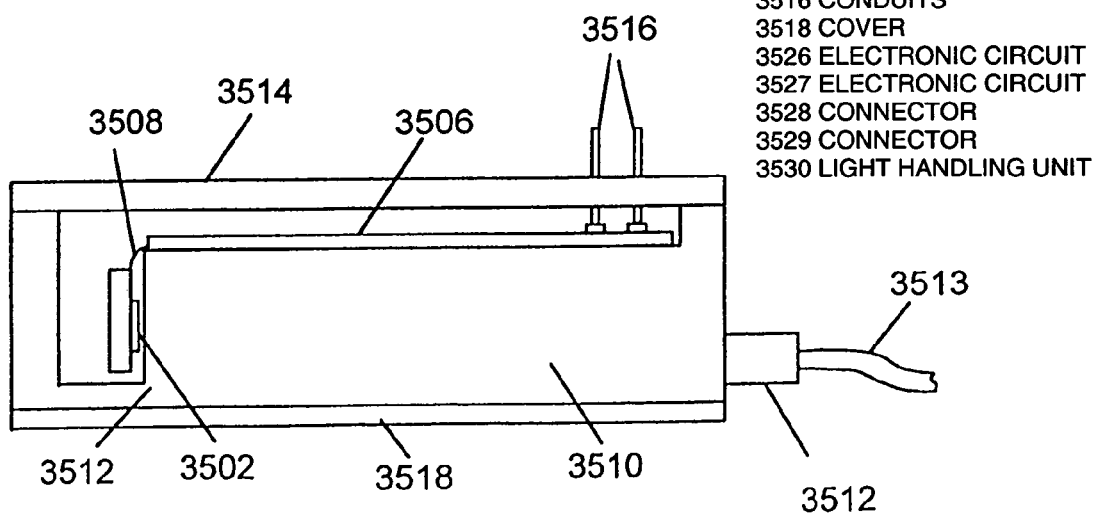

An approach to providing monitoring and data analysis capabilities to the a device having an integral frame is schematically illustrated in FIGS. 35A and 35B. An electronics package 3500 is illustrated in FIG. 35A, that includes a detector array 3502, for example a photodiode array, mounted on a substrate 3504. The substrate 3504 is electrically coupled to a board 3506, for example a printboard, that contains electronics for controlling the detector array 3502 and for analyzing detection signals produced by the detector array 3502. The substrate 3504 and board 3506 may be coupled by a flexible link 3508, using, for example, flex-print. The board 3506 may include connection pads 3509 for forming an electrical connection to external circuits, for example power supply or data collection and analysis circuits.

The electronics package 3500 is illustrated in use with an embodiment of integral body 3510 in FIG. 35B. The integral frame 3510 may include transmission diffraction gratings, along with focusing and collimating optics, as was described with reference to FIG. 26. A fiber 3513 may be coupled to the collimation unit 3512 to input light to the integral frame 3510. The board 3506 is placed on one side of the integral frame 3510, with the detector array 3502 positioned at the output end 3512 of the integral frame 3510 to detect the dispersed light beams. The flexible link 3508 permits the detector array 3502 to be positioned at the end of the integral frame 3510 while the board 3506 is positioned along the side of the integral body 3510, thus saving space. The board 3506 and substrate 3504 may be attached to the integral frame 3510 using, for example, screws, epoxy or some other type of fastening (not shown).

A cover 3514 may be attached to the integral frame 3510 to provide protection to the board 3506. The cover 3514 may include electrical conduits 3516 that connect through the cover 3514 to the connection pads 3509. The conduits 3516 may be pins that coupe to the connection pads 3509 by pressure, for example using spring-bias. In another approach (not illustrated), the board 3506 may be provided with electrical connectors that protrude through apertures in the cover 3514. The cover 3514 may be attached to the integral frame 3510 using any suitable method, including screws or other fasteners, soldering, welding or adhesive. An o-ring seal may be provided between the cover 3514 and the integral frame 3510 to prevent the ingress of dust, particles and other contaminants to the integral frame 3510. A second cover 3518 may be provided on the other side of the integral frame 3510 to provide easy access within the integral frame 3510 for mounting optical components.

Figure 35C:
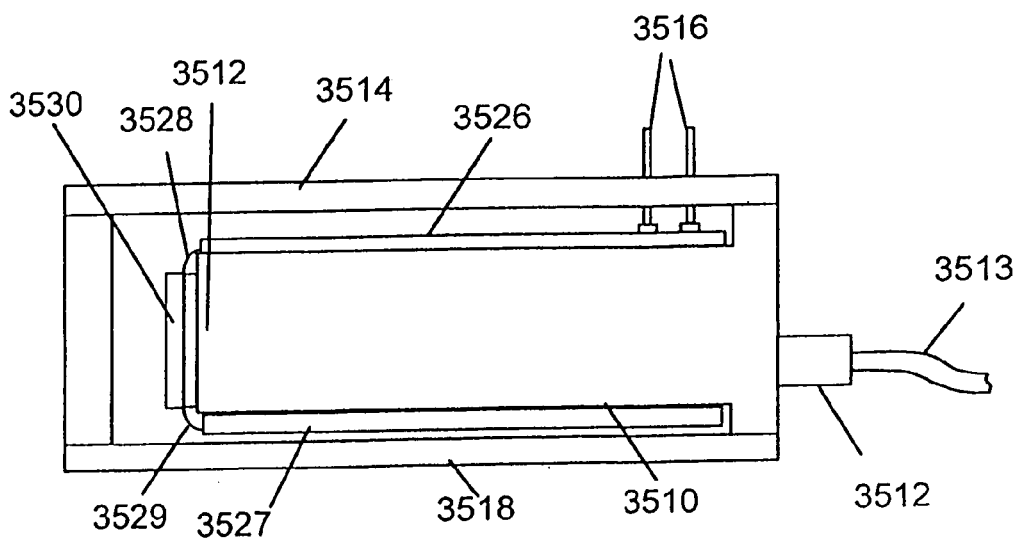

Another embodiment using an integrated frame 3510 is illustrated in FIG. 35C. In this embodiment 3500, a light handling unit 3530, which may be, for example, a detector array or optical switch array, is attached to one end 3512 of the integrated frame 3510. Electronic circuits 3526 and 3527 may be positioned on either side of the integrated frame 3510. The electronic circuits 3526 and 3528 may be coupled to the light handling unit 3530 by flexible connectors 3528 and 3529. Covers 3514 and 3532 on either side of the integral frame 3510 may be provided to protect the electronic circuits 3526 and 3527 and to prevent ingress of contaminants to the optical components mounted on the integral frame 3510.

It is often useful to ensure that the intensity in each channel in a multi-channel WDM signal is approximately of the same intensity, or that the relative power in each channel is at a desired level. Some types of fiber amplifier, for example an erbium-doped fiber amplifier have a non-uniform gain profile, with the result that some channels are amplified to greater power levels than others. A gain flattening filter is often used following a fiber amplifier to make the channel power levels more uniform.

One particular embodiment of a double-transmission grating-based WDM device 3600 configured for controlling the power profile of a multiple channel signal, in other words for controlling the power level of individual channels within a multiple channel signal, is schematically illustrated in FIGS. 36A and 36B. Such a device 3600 may be advantageously used as a gain flattening filter, and is described as such below. However, it will be appreciated that the device may be used to control the power profile of a multiple channel signal in other situations also, and not only for flattening the multiple channel power profile following amplification in a fiber amplifier.

Respectively orthogonal views of the device 3600 are illustrated in FIGS. 36A and 36B. Light is input to the device 3600 through the input fiber 3602 and is collimated using a collimator 3604. Light is diffracted by the diffracting elements 214 and 216, and the diffracted light 222 is focused by a focusing optic 220 to an attenuating reflective array 3630. The attenuating reflective array 3630 includes a number of attenuating reflectors 3632, associated with respective optical channels at the dispersed region 224. The attenuating reflectors 3632 reflect the incident light to the focusing optic 220 where the reflected light is collimated. The light reflected by the attenuating reflective array 3630 is recombined into a multiple channel signal 3634 by the diffracting elements 214 and 216, and is focused by a focusing unit 3614 into the output fiber 3612.

Typically, the reflectivity of an attenuating reflector 3632 is lower for reflecting those channels that are amplified to a greater power level in the amplifier and is higher for those channels amplified to a lesser power in the amplifier. Therefore, where the power spectrum across the different channels in the input beam 212 is known, the reflectivity of the reflectors 3632 may be selected so that the multiple channel output beam 3634 has an approximately flat power spectrum across all the channels, or has a power spectrum that is otherwise tailored to a desired function of wavelength.

Figure 37:
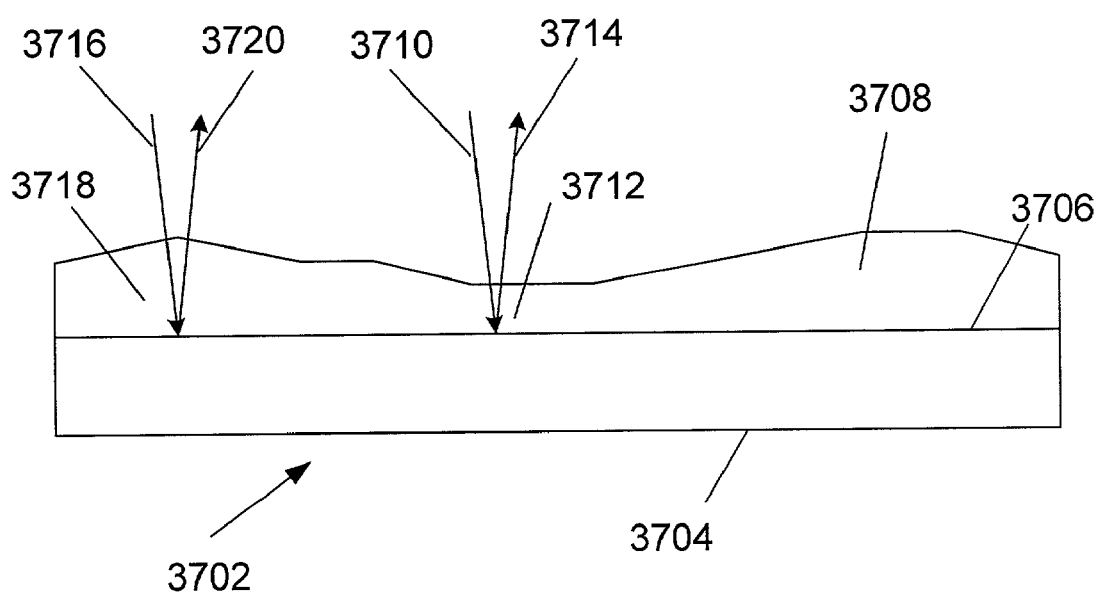
FIG. 37 schematically illustrates one embodiment of an attenuating reflector having a spatially non-uniform reflection profile.

The attenuating reflectors 3632 may be formed of mirrors for example formed by dielectric coatings on a substrate, having different reflectivities. In another approach, a mirror, having a spatially non-uniform reflectivity, is provided as the attenuating reflector array 3630. One particular embodiment of such a mirror 3702 is schematically illustrated in FIG. 37. The mirror 3702 is formed from a substrate 3704 having a reflective surface 3706, for example a dielectric reflector. An absorbing coating 3708 is formed over the reflective surface 3706. The thickness of the absorbing coating 3708 is spatially non-uniform, having some portions thinner than others. The absorbing coating 3708 may be etched to produce a desired spatially non-uniform reflectivity profile. Light ray 3710, for example, passes through portion 3712 and is reflected to produce light ray 3714, and light ray 3716 passes through portion 3718 and is reflected to produce light ray 3720. The effective reflectivity of the mirror 3702 seen by ray 3710 is higher than for ray 3716, since ray 3710 passes through less absorbing material. The spatially non-uniform reflectivity profile may be tailored to provide the desired level of reflection for each channel incident on the mirror 3702.

It will be appreciated that other approaches to forming a mirror whose reflectivity is spatially non-uniform may be used. For example, rather than varying the thickness of an absorbing material, the absorption of the absorbing material may be spatially non-uniform.

Figure 38:
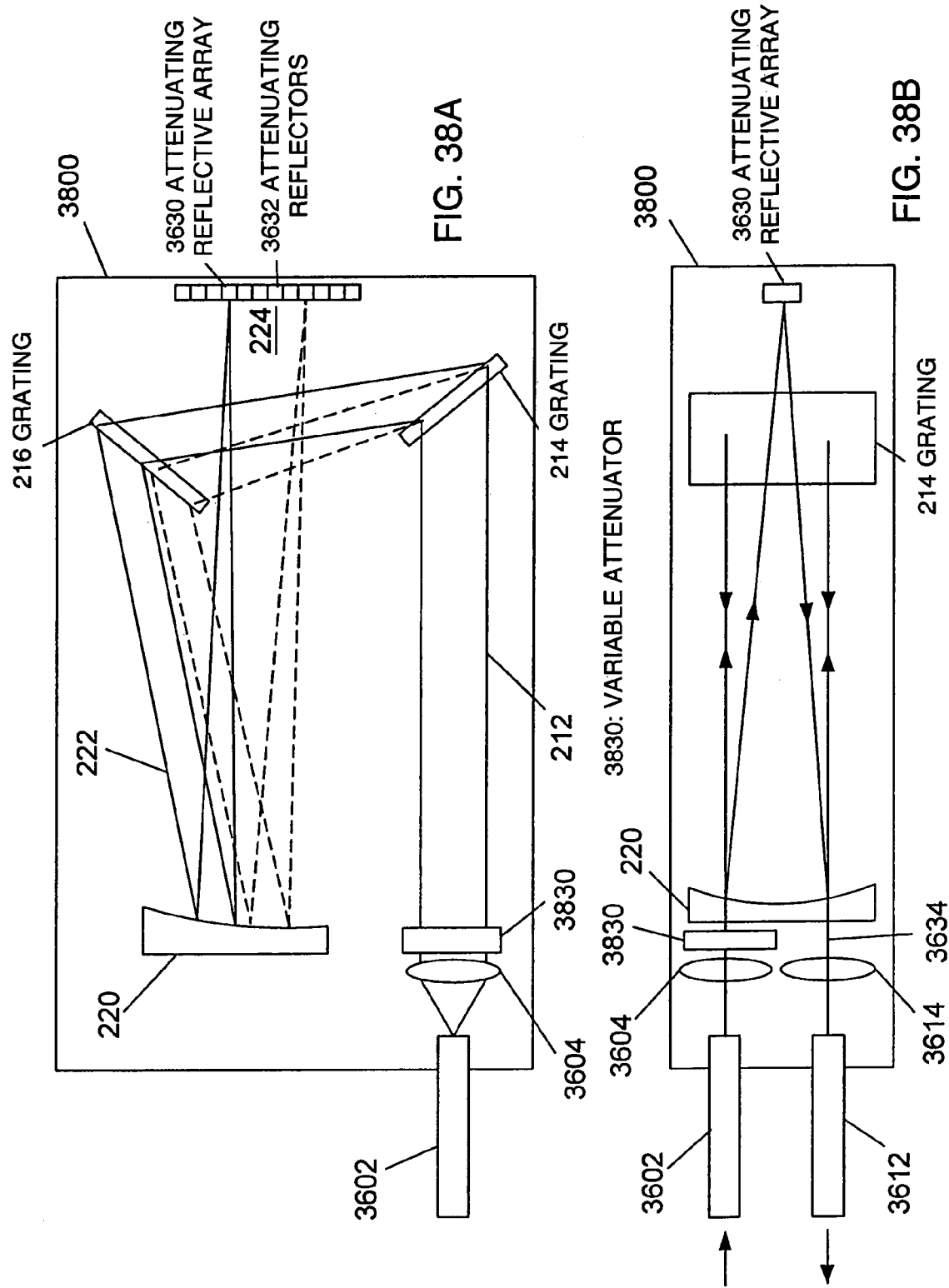
FIGS. 38A and 38B schematically illustrate another embodiment of a gain flattening filter according to the present invention.

Another embodiment of a double-transmission grating-based WDM device 3800 configured for use as a gain flattening filter is schematically illustrated in FIGS. 38A and 38B. The device 3800 is similar to that illustrated in FIGS. 36A and 36B, but has an additional variable attenuator 3830 disposed in one of the multiple channel beams. In the illustrated embodiment, the variable attenuator 3830 is disposed in the multiple channel input beam 212 from the input fiber 3602. The variable attenuator 3830 permits the device 3800 to dynamically control the overall throughput, as well providing static gain flattening.

Figure 39:
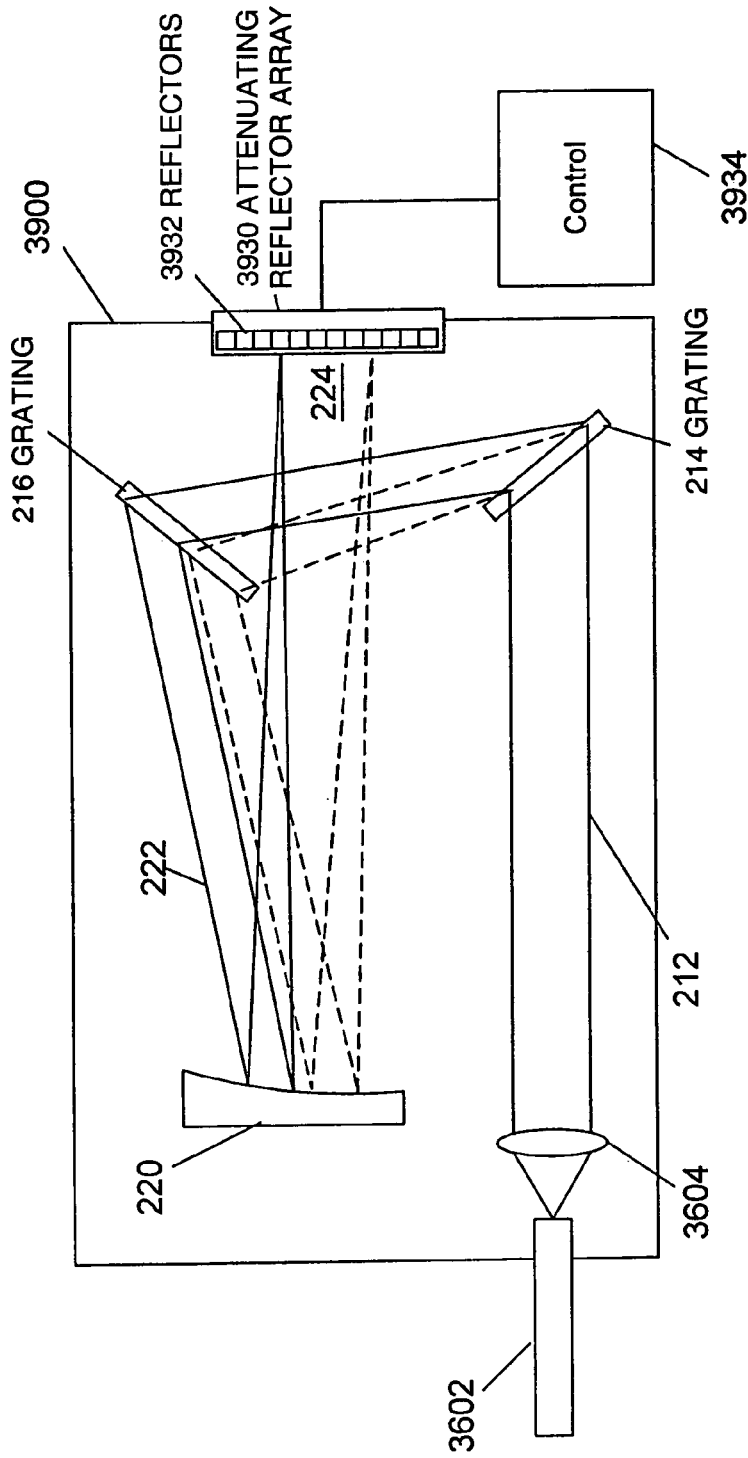
FIG. 39 schematically illustrates an embodiment of a dynamic gain flattening filter according to the present invention.

Another embodiment of a double-transmission grating-based WDM device 3900 configured for use as a dynamic gain flattening filter is schematically illustrated in FIG. 39. Instead of having a static attenuating reflector array, the device 3900 includes a dynamic attenuating reflector array 3930 that includes reflectors 3932 having individually variable attenuation under control of a control unit 3934. Thus, the control unit may vary the reflectivity of one or more of the reflectors 3934 according to changing operating conditions in the fiber optics communication system, and thus dynamically alter the spatial reflectivity profile of the attenuating reflector array 3930.

Figure 40:
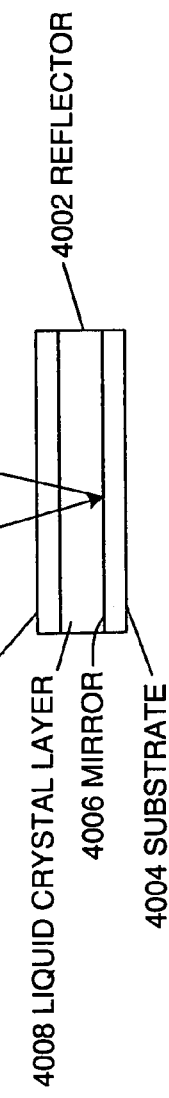
FIG. 40 schematically illustrates a cross-section through a reflector having variable reflectivity.

One particular embodiment of a reflector 4002 having a variable attenuation is schematically illustrated in FIG. 40. A mirror 4006, such as a reflecting stack of dielectric layers, is disposed on a substrate 4004. A liquid crystal layer 4008 is disposed above the mirror 4006, with a polarizer 4010 over the liquid crystal layer 4008. Light 4012 entering the reflector 4002 passes through the polarizer 4010. If the light 4012 is polarized parallel to the transmission direction of the polarizer 4012, the losses upon entering the polarizer 4012 are relatively low. The light passes through the liquid crystal layer 4008, is reflected by the mirror 4006 and passes back through the liquid crystal layer 4008 to the polarizer 4010. The liquid crystal layer 4008 may, under a variable applied voltage, rotate the polarization of the light 4012 to a greater or lesser degree. Where the round trip rotation of the polarization is set close to zero or an integer multiple of $\pi$ radians, the reflected beam 4014 exiting the reflector 4002 has a relatively high power. Where the round trip rotation of the polarization is set close to zero, or an integer multiple of $\pi$ radians plus $\pi/2$ radians, then the reflected beam exiting the reflector has a relatively low power. Variation of the control voltage applied to the liquid crystal layer 4008 results in controllable variation of the power in the reflected beam 4014.

It will be appreciated that other types of variable attenuation reflector may also be used. For example, the reflector may include a quarter wave retarding layer to rotate the polarization of the light passing into the reflector.

It is important to note that the invention is not limited to the embodiments illustrated in the figures described above, and that certain elements may be changed without exceeding the scope of the invention. For example, planar waveguides may be used instead of either the multiple channel fiber 202 or the single channel fibers 232 input fiber, along with suitable coupling optics to adapt the light propagating to and from the waveguides.

As noted above, the present invention is applicable to DWDM optical communications systems, and is believed to be particularly useful for use in MUX/DMUX, channel monitoring, and OADMs. The present invention should not be considered limited to the particular examples described above, but rather should be understood to cover all aspects of the invention as fairly set out in the attached claims. Various modifications, equivalent processes, as well as numerous structures to which the present invention may be applicable will be readily apparent to those of skill in the art to which the present invention is directed upon review of the present specification. The claims are intended to cover such modifications and devices.

We claim:

1. A channel power control device, comprising;
a first multiple channel port;
a second multiple channel port;
a dispersion region where individual optical channels propagating from the first multiple channel port are spaced apart;
a diffraction unit disposed between the first multiple channel port and the dispersion region, the diffraction unit defining wavelength-specific optical paths between the first multiple channel port and respective single channel ports of a plurality of single channel ports, the diffraction unit including at least first and second transmissive diffraction elements that increase the spacing of the individual ootical channels; and
a plurality of reflectors in the dispersion region disposed to reflect respective individual optical channels from the first multiple channel port to the second multiple channel port.

2. A device as recited in claim 1, further comprising a first light focusing unit disposed on the plurality of wavelength-specific optical paths between the first multiple channel port and the diffraction unit.

3. A device as recited in claim 2, wherein the first light focusing unit substantially collimates light propagating from the first multiple channel port towards the plurality of single channel ports.

4. A device as recited in claim 1, further comprising a second light focusing unit disposed on the wavelength-specific optical paths between the diffraction unit and the plurality of reflectors.

5. A device as recited in claim 1, further comprising a third light focusing unit disposed between the diffraction unit and the second multiple channel port to focus a multiple channel signal from the diffraction unit to the second multiple channel port.

6. A device as recited in claim 1, further comprising a polarization separation unit disposed between the first multiple channel port and the diffraction unit to separate light entering the device from the first multiple channel port into first and second components having mutually orthogonal polarizations.

7. A device as recited in claim 6, wherein the polarization separation unit includes a polarization rotator disposed on a path of at least one of the components to rotate polarization of the at least one of the components so as to parallelize polarization directions of the first and second components.

8. A device as recited in claim 1, further comprising a multiple channel waveguide coupled to the first multiple channel port.

9. A device as recited in claim 1, wherein the reflectors have fixed values of reflectivity selected so as to impose a desired reflectivity profile across multiple channels received from the first multiple channel port.

10. A device as recited in claim 9, wherein the plurality of reflectors includes different reflecting regions on a reflecting unit.

11. A device as recited in claim 10, wherein the reflecting unit includes a substrate having a reflecting surface and an absorbing layer disposed over the reflecting surface.

12. A device as recited in claim 11, wherein the absorbing layer has different values of thickness at different reflecting regions of the reflecting unit.

13. A device as recited in claim 1, further comprising a dynamically adjustable attenuator disposed between the diffraction unit and one of the first and second multiple channel ports.

14. A device as recited in claim 1, wherein at least one reflector of the plurality of reflectors has a dynamically adjustable reflectivity.

15. A device as recited in claim 14, wherein the at least one reflector having a dynamically adjustable reflectivity is coupled to receive reflectivity control signals from a controller.

16. A device as recited in claim 14, wherein the at least one reflector having a dynamically adjustable reflectivity includes a mirror surface and a polarizer separated from the mirror surface, a liquid crystal layer being disposed between the polarizer and the mirror surface, a value of polarization rotation imposed by the liquid crystal layer on light entering the liquid crystal layer being adjustable.

17. A device as recited in claim 16, wherein the device further includes a polarization separation unit disposed between the first multiple channel port and the diffraction unit to separate light entering the device from the first multiple channel port into first and second components having mutually orthogonal polarizations and a polarization rotator to rotate polarization states of at least one of the first and second components so that the polarization directions of the first and second components are parallel to a first polarization direction and the polarizer has a pass polarization direction that is parallel to the first polarization direction.

18. A channel power control device, comprising:
a first multiple channel port;
a second multiple channel port;
a dispersion region where individual optical channels propagating from the first multiple channel port are spaced apart;
a diffraction unit disposed between the first multiple channel port and the dispersion region, the diffraction unit defining wavelength-specific optical paths between the first multiple channel port and respective single channel ports of a plurality of single channel ports, the diffraction unit including at least first and second transmissive diffraction elements;
a plurality of reflectors in the dispersion region disposed to reflect respective individual optical channels from the first multiple channel port to the second multiple channel port; and
a second light focusing unit disposed on the wavelength-specific optical paths between the diffraction unit and the plurality of reflectors.

19. A channel power control device, comprising:
a first multIple channel port;
a second multiple channel port;
a dispersion region where individual optical channels propagating from the first multiple channel port are spaced apart;
a diffraction unit disposed between the first multiple channel port and the dispersion region, the diffraction unit defining wavelength-specific optical paths between the first multiple channel port and respective single channel ports of a plurality of single channel ports, the diffraction unit including at least first and second transmlssive diffraction elements;
a plurality of reflectors in the dispersion region disposed to reflect respective individual optical channels from the first multiple channel port to the second multiple channel port; and
a polarization separation unit disposed between the first multiple channel port and the diffraction unit to separate light entering the device from the first multiple channel port into first and second components having mutually orthogonal polarizations.

20. A channel power control device, comprising:
a first multiple channel port;
a second multiple channel port;
a dispersion region where individual optical channels propagating from the first multiple channel port are spaced apart;
a diffraction unit disposed between the first multiple channel port and the dispersion region, the diffraction unit defining wavelength-specific optical paths between the first multiple channel port and respective single channel ports of a pluralIty of single channel parts, the diffraction unit including at least first and second transmissive diffraction elements;
a plurality of reflectors in the dispersion region disposed to reflect respective individual optical channels from the first multiple channel port to the second multiple channel port; and
a polarization separation unit disposed between the first multiple channel port and the diffraction unit to separate light entering the device from the first multiple channel port into first and second components having mutually orthogonal polarizations;
wherein the polaiization separation unit includes a polarization rotator disposed on a path of at least one of the components to rotate polarization of the at least one of the components so as to parallelize polarization directions of the first and second components.

21. A channel power control device, comprising:
a first multiple channel port;
a second multiple channel part
a dispersion region where individual optical channels propagating from the first multiple channel port are spaced apart;
a diffraction unit disposed between the first multiple channel port and the dispersion region, the diffraction unit defining wavelength-specific optical paths between the first multiple channel port and respective single channel ports of a plurality of single channel ports, the diffraction unit including at least first and second transmissive diffraction elements; and
a plurality of reflectors in the dispersion region disposed to reflect respective individual optical channels from the first multiple channel port to the second multiple channel port;
wherein the reflectors have fixed values of reflectivity selected so as to impose a desired reflectivity profile across multiple channels received from the first multiple channel port; and wherein the plurality of reflectors includes different reflecting regions on a reflecting unit.

22. A device as recited in claim 21, wherein the reflecting unit includes a substrate having a reflecting surface and an absorbing layer disposed over the reflecting surface.

23. A device as recited in claim 22, wherein the absorbing layer has different values of thickness at different reflecting regions of the reflecting unit.

24. A channel power control device, comprising:
a first multiple channel port;
a second multiple channel port;
a dispersion region where individual optical channels propagating from the first multiple channel port are spaced apart;
a diffraction unit disposed between the first multiple channel port and the dispersion region, the diffraction unit defining wavelength-specific optical paths between the first multiple channel port and respective single channel ports of a plurality of single channel ports, the diffraction unit including at least first and second transmissive diffraction elements;
a plurality of reflectors in the dispersion region disposed to reflect respective individual optical channels from the first multiple channel port to the second multiple channel port; and
a dynamIcally adjustable attenuator disposed between the diffraction unit and one of the first and second multiple channel ports.

25. A channel power control device, comprising:
a first multiple channel port;
a second multiple channel port;
a dispersion region where individual optical channels propagating from the first multiple channel port are spaced apart;
a diffraction unit disposed between the first multiple channel port and the dispersion region, the diffraction unit defining wavelength-specific optical paths between the first multiple channel port and respective single channel ports of a plurality of single channel ports, the diffraction unit including at least first and second transmissive diffraction elements; and
a plurality of reflectors in the dispersion region disposed to reflect respective individual optical channels from the first multiple channel port to the second multiple channel port;
wherein at least one reflector of the plurality of reflectors has a dynamically adjustable reflectivity.

26. A device as recited in claim 25, wherein the at least one reflector having a dynamically adjustable reflectivity is coupled to receive reflectivity control signals from a controller.

27. A device as recited in claim 25, wherein the at least one reflector having a dynamically adjustable reflectivity Includes a mirror surface and a polarizer separated from the mirror surface, a liquid crystal layer being disposed between the polarizer and the mirror surface, a value of polarization rotation imposed by the liquid crystal layer on light entering the liquid crystal layer being adjustable.

28. A device as recited in claim 27, wherein the device further includes a polarization separation unit disposed between the first multiple channel port and the diffraction unit to separate light entering the device from the first multiple channel port into first and second components having mutually orthogonal polarizations and a polarization rotator to rotate polarization states of at least one of the first and second components so that the polarization directions of the first and second components are parallel to a first polarization direction and the polarizer has a pass polarization direction that is parallel to the first polarization direction.

* * * * *